(12) United States Patent (10) Patent No.: US 11,855,725 B2
Faxér et al. (45) Date of Patent: Dec. 26, 2023

(54) RESOURCE ELEMENTS FOR PHYSICAL DOWNLINK CHANNEL AND APERIODIC INTERFERENCE MEASUREMENT

(71) Applicant: Telefonaktiebolaget LM Ericsson (publ), Stockholm (SE)

(72) Inventors: Sebastian Faxér, Järfälla (SE); Shiwei Gao, Nepean (CA); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 840 days.

(21) Appl. No.: 16/960,667

(22) PCT Filed: Dec. 21, 2018

(86) PCT No.: PCT/EP2018/086778
§ 371 (c)(1),
(2) Date: Jul. 8, 2020

(87) PCT Pub. No.: WO2019/137811
PCT Pub. Date: Jul. 18, 2019

(65) Prior Publication Data
US 2020/0389218 A1 Dec. 10, 2020

Related U.S. Application Data

(60) Provisional application No. 62/616,913, filed on Jan. 12, 2018.

(51) Int. Cl.
*H04B 7/06* (2006.01)
*H04B 17/336* (2015.01)
(Continued)

(52) U.S. Cl.
CPC ......... *H04B 7/0626* (2013.01); *H04B 17/336* (2015.01); *H04L 1/0013* (2013.01);
(Continued)

(58) Field of Classification Search
CPC .. H04B 7/0626; H04B 17/336; H04B 7/0452; H04L 1/0013; H04L 5/0051;
(Continued)

(56) References Cited

U.S. PATENT DOCUMENTS 9,106,386 B2 8/2015 Etemad et al.
10,084,577 B2 9/2018 Nimbalker et al.
(Continued)

FOREIGN PATENT DOCUMENTS

CN 105978677 A 9/2016
CN 107231825 A 10/2017
(Continued)

OTHER PUBLICATIONS

Onggosanusi, E., "Enhancement on Full-Dimension (FD) MIMO for LTE", 3GPP TSG RAN meeting #75, Dubrovnik, Croatia, Mar. 6-9, 2017, pp. 1-7, RP-1700174, 3GPP.

(Continued)

*Primary Examiner* — Charles N Appiah
*Assistant Examiner* — Frank E Donado
(74) *Attorney, Agent, or Firm* — COATS & BENNETT, PLLC

(57) ABSTRACT

A solution presented herein enables a network node (500, 600) to send, and corresponding wireless device (300, 400) to receive, a physical downlink channel on either a first set of resource elements scheduled for that wireless device (300, 400), or on a set of 5 resource elements that includes all of the first set except for a subset that was also scheduled for interference measurement resources. In so doing, the solution presented herein avoids the issues caused by the overlapping signals, and thus improve scheduling flexibility, reduce complexity, and reduce overhead.

21 Claims, 18 Drawing Sheets

(51) Int. Cl.
  *H04L 1/00* (2006.01)
  *H04L 5/00* (2006.01)
  *H04L 25/03* (2006.01)
  *H04W 24/10* (2009.01)
  *H04W 72/23* (2023.01)

(52) U.S. Cl.
  CPC ...... *H04L 5/0051* (2013.01); *H04L 25/03343* (2013.01); *H04W 24/10* (2013.01); *H04W 72/23* (2023.01); *H04L 2025/03426* (2013.01)

(58) Field of Classification Search
  CPC ..... H04L 25/03343; H04L 2025/03426; H04L 25/0224; H04L 5/0048; H04L 5/0094; H04L 5/0053; H04W 24/10; H04W 72/23
  See application file for complete search history.

(56) References Cited

U.S. PATENT DOCUMENTS

| | | | |
|---|---|---|---|
| RE49,548 E * | 6/2023 | Ng | H04L 5/0092 370/329 |
| 2017/0063503 A1 | 3/2017 | Liu et al. | |
| 2020/0029352 A1* | 1/2020 | Aiba | H04W 28/0278 |

FOREIGN PATENT DOCUMENTS

| | | |
|---|---|---|
| CN | 107431574 A | 12/2017 |
| EP | 2869478 A1 | 5/2015 |
| WO | 2016122852 A1 | 8/2016 |
| WO | 2018006311 A1 | 1/2018 |

OTHER PUBLICATIONS

ZTE et al., "Summary of remaining issues on CSI measurement", 3GPP TSG RAN WG1 Meeting #91, Reno, USA, Nov. 27, 2017, pp. 1-10, R1-1721634, 3GPP.

Ericsson, "On remaining details of CSI measurement", 3GPP TSG RAN WG1 #91, Reno, USA, Nov. 27, 2017, pp. 1-10, R1-1720733, 3GPP.

3rd Generation Partnership Project, "3rd Generation Partnership Project; Technical Specification Group Radio Access Network; NR; Physical layer procedures for data (Release 15)", Technical Specification, 3GPP TS 38.214 V15.1.0, Mar. 1, 2018, pp. 1-77, 3GPP.

The European Telecommunications Standards Institute, "5G; NR; Physical Layer Procedures for Data (3GPP TS 38.214 version 15.3.0 Release 15)", Technical Specification, ETSI TS 138 214 V15.3.0, Oct. 1, 2018, pp. 1-99, ETSI.

* cited by examiner

RESOURCE ELEMENTS FOR PHYSICAL DOWNLINK CHANNEL AND APERIODIC INTERFERENCE MEASUREMENT

This application claims priority to Provisional U.S. Patent Application No. 62/616,913 filed 12 Jan. 2018, the disclosure of which is incorporated herein by reference in its entirety.

TECHNICAL FIELD

The solution presented herein relates to Downlink Control Information (DCI), and the use of the DCI to schedule Resource Elements (REs) for receiving downlink transmissions on a physical downlink channel.

BACKGROUND

The next generation mobile wireless communication system (5G) or new radio (NR) will support a diverse set of use cases and a diverse set of deployment scenarios. The later includes deployment at both low frequencies (e.g., 100 s of MHz), similar to Long Term Evolution (LTE) today, and very high frequencies (e.g., mm waves in the tens of GHz).

Similar to LTE, NR will use Orthogonal Frequency Division Multiplexing (OFDM) in the downlink (e.g., from a network node, gNB, eNB, or base station, to a User Equipment (UE), wireless device, etc.). In the uplink (e.g., from UE to gNB), both Discrete Fourier Transform-spread (DFT-spread) OFDM and OFDM will be supported.

The basic NR physical resource can thus be seen as a time-frequency grid, where each resource element corresponds to one OFDM subcarrier during one OFDM symbol interval. FIG. 1 shows an example of such a time-frequency grid. Resource allocation in a slot is described in terms of resource blocks (RBs) in the frequency domain and number of OFDM symbols in the time domain. A RB corresponds to 12 contiguous subcarriers and a slot consists of 14 OFDM symbols.

Different subcarrier spacing values are supported in NR. The supported subcarrier spacing values (also referred to as numerologies) in NR are given by $\Delta f = (15 \times 2^\alpha)$ kHz where $\alpha$ represents a non-negative integer.

In the time domain, downlink and uplink transmissions in NR are organized into equally-sized subframes similar to LTE. FIG. 2 shows an exemplary NR time-domain structure with 15 kHz subcarrier spacing. A subframe is further divided into slots and the number of slot per subframe is $2^{\alpha+1}$ for a numerology of $(15 \times 2^\alpha)$ kHz.

NR supports "slot based" transmission. In each slot, the gNB transmits Downlink Control Information (DCI) about which UE data is to be transmitted to and what resources in the current downlink slot the data is transmitted on. The DCI is carried on the Physical Downlink Control Channel (PDCCH) and data is carried on Physical Downlink Shared Channel (PDSCH).

A transmission on the PDCCH is typically transmitted in Control Resource Sets (CORSETs) in the first few OFDM symbols in each slot. A UE first decodes the PDCCH. If a PDCCH is decoded successfully, the UE decodes the corresponding PDSCH based on the decoded DCI in the PDCCH.

Uplink data transmissions are also dynamically scheduled using PDCCH. Similar to downlink, a UE first decodes an uplink grant in a DCI carried by the PDCCH, and then transmits data over the Physical Uplink Shared Channel (PUSCH) based on the decoded control information in the uplink grant, e.g., modulation order, coding rate, uplink resource allocation, etc.

Each UE is assigned a unique Cell Radio Network Temporary Identifier (C-RNTI) during network connection. The Cyclic Redundancy Check (CRC) bits attached to a DCI for a UE are scrambled by the UE's C-RNTI, enabling a UE to recognize its own DCI by checking the CRC bits of the DCI against the assigned C-RNTI.

For UL scheduling of PUSCH, at least the following bit fields are included in an UpLink (UL) DCI:
Frequency domain resource assignment
Time domain resource assignment
Modulation and coding scheme—5 bits
New data indicator—1 bit
Redundancy version—2 bits
HARQ process number—4 bits
TPC command for scheduled PUSCH—2 bits
Channel State Information (CSI) request—0, 1, 2, 3, 4, 5, or 6 bits determined by higher layer parameter ReportTriggerSize.

For DownLink (DL) scheduling of PDSCH, at least the following bit fields are included in a DL DCI
Frequency domain resource assignment
Time domain resource assignment
Modulation and coding scheme—5 bits
New data indicator—1 bit
Redundancy version—2 bits
Hybrid Automatic Repeat reQuest (HARQ) process number—4 bits
Zero Power CSI Reference Signal (ZP CSI-RS) trigger—X bits Channel state information (CSI) feedback is used by the gNB to obtain DL CSI from a UE in order to determine how to transmit DL data to a UE over plurality of antenna ports. CSI typically includes a channel Rank Indicator (RI), a Precoding Matrix Indicator (PMI), and a Channel Quality Indicator (CQI). The RI is used to indicate the number of data layers that can be transmitted simultaneously to a UE, the PMI is used to indicate the precoding matrix over the indicated data layers, and the CQI is used to indicate the modulation and coding rate that can be achieved with the indicated rank and the precoding matrix.

In addition to periodic and aperiodic CSI reporting as in LTE, NR also supports semi-persistent CSI reporting, see e.g., $3^{rd}$ Generation Partnership Project (3GPP) technical specification (TS) 38.214 v15.0.0 (2017-12). Thus, NR supports three types of CSI reporting as follows:
Periodic CSI (P-CSI) Reporting on PUCCH: CSI is reported periodically by a UE. Parameters such as periodicity and slot offset are configured semi-statically by higher layer Radio Resource Control (RRC) signalling from the gNB to the UE
Aperiodic CSI (A-CSI) Reporting on PUSCH: This type of CSI reporting involves a single-shot (e.g., one time) CSI report by a UE which is dynamically triggered by the gNB using the DCI. Some of the parameters related to the configuration of the aperiodic CSI report is semi-statically configured by RRC signalling but the triggering is dynamic
Semi-Persistent CSI (SP-CSI) Reporting on PUSCH: similar to periodic CSI reporting, semi-persistent CSI reporting has a periodicity and slot offset which may be semi-statically configured. However, a dynamic trigger from gNB to UE may be needed to allow the UE to begin semi-persistent CSI reporting. A dynamic trigger from gNB to UE is needed to request the UE to stop the semi-persistent CSI reporting The UE uses the Non-Zero Power (NZP) CSI-RS for measuring downlink CSI. The gNB transmits the CSI-RS over each transmit (Tx) antenna port at the gNB and for different antenna ports, the CSI-RS are multiplexed in time, frequency, and code domain such that the channel between each Tx antenna port at the gNB and each receive antenna port at a UE can be measured by the UE. A time frequency resource used for transmitting CSI-RS is referred to as a CSI-RS resource.

In NR, the following three types of CSI-RS transmissions are supported:

Periodic CSI-RS (P CSI-RS): CSI-RS is transmitted periodically in certain slots. This CSI-RS transmission is semi-statically configured using parameters such as CSI-RS resource, periodicity, and slot offset.

Aperiodic CSI-RS (AP CSI-RS): This is a one-shot CSI-RS transmission that can happen in any slot. Here, one-shot means that CSI-RS transmission only happens once per trigger. The CSI-RS resources (e.g., the resource element locations which include subcarrier locations and OFDM symbol locations) for aperiodic CSI-RS are semi-statically configured. The transmission of aperiodic CSI-RS is triggered by dynamic signalling through the PDCCH using the CSI request field in the UL DCI. Multiple aperiodic CSI-RS resources can be included in a CSI-RS resource set and the triggering of aperiodic CSI-RS occurs on a resource set basis.

Semi-Persistent CSI-RS (SP CSI-RS): Similar to periodic CSI-RS, resources for semi-persistent CSI-RS transmissions are semi-statically configured with parameters such as periodicity and slot offset. However, unlike periodic CSI-RS, SP CSI-RS requires dynamic signalling to activate and deactivate the CSI-RS transmission.

In the case of aperiodic CSI-RS and/or aperiodic CSI reporting, the gNB RRC configures the UE with $S_c$ CSI triggering states. Each triggering state contains the aperiodic CSI report setting to be triggered along with the associated aperiodic CSI-RS resource sets.

In NR, a UE can be configured with N≥1 CSI reporting settings (e.g., ReportConfigs), M≥1 resource settings (e.g., ResourceConfigs), and one CSI measurement setting, where the CSI measurement setting includes L≥1 Measurement Links (e.g., MeasLinkConfigs). At least the following configuration parameters are signalled via RRC for CSI acquisition.

1. N, M, and L are indicated either implicitly or explicitly
2. Each CSI reporting setting includes at least the following:
   reported CSI parameter(s), e.g., RI, PMI, and CQI
   CSI Type if reported, e.g., Type I or Type II
   Codebook configuration including codebook subset restriction
   Time-domain behaviour, e.g., P-CSI, SP-CSI, or A-CSI
   Frequency granularity for CQI and PMI, e.g., wideband, partial band, or subband
   Measurement restriction configurations, e.g., Resource Blocks (RBs) in frequency domain and slots in time domain
3. In each CSI-RS resource setting:
   A configuration of S≥1 CSI-RS resource set(s)
   A configuration of $K_s$≥1 CSI-RS resources for each resource set s, including at least: mapping to REs, the number of antenna ports, time-domain behavior, etc.
   Time domain behavior: aperiodic, periodic, or semi-persistent
4. In each of the L links in CSI measurement setting:
   CSI reporting setting indication, Resource setting indication, quantity to be measured (either channel or interference)
   One CSI reporting setting can be linked with one or multiple Resource settings
   Multiple CSI reporting settings can be linked to one resource setting FIG. 3 shows an exemplary aperiodic CSI (A-CSI) reporting. A-CSI reporting over PUSCH is triggered by a DCI for scheduling PUSCH, e.g., an UL DCI. A special CSI request bit field in the DCI is defined for this purpose. Each value of the CSI request bit field defines a codepoint and each codepoint can be associated with a higher layer configured CSI report trigger state. The first codepoint with all "0"s corresponds to no CSI request. For A-CSI reporting, each of the $S_c$ triggering states comprises an indication of one or more A-CSI reports to be triggered. Optionally, each triggered A-CSI report may also trigger aperiodic NZP CSI-RS resource sets for channel measurements, aperiodic CSI-IM, and/or aperiodic NZP CSI-RS for interference measurements. Thus, each CSI report trigger state defines at least the following information:

Resource configurations
    CSI-RS resource for channel measurement
    Interference measurement resource for interference measurement
CSI report configuration:
    The type of CSI report, e.g., wideband or subband, Type I or Type II codebook used, etc.

The bit width, $L_c$, of the CSI request field is configurable from 0 to 6 bits. When the number of CSI triggering states, $S_c$, is larger than the number of codepoints, e.g., $S_c > 2^{L_c}-1$, the Medium Access Control (MAC) control element (CE) is used to select a subset of the $2^{L_c}-1$ triggering states from the $S_c$ triggering states so that there is a one-to-one mapping between each codepoint and a CSI triggering state.

For measurements on channel and interference, two types of resources are defined: Non-Zero Power (NZP) CSI-RS and CSI-IM. The network node (or gNB) transmits the NZP CSI-RS to the UEs to enable the UEs to estimate the downlink channels to the network node. For CSI-IM, the network indicates a resource, as given by a set of REs, for the UE to perform interference measurements upon, see e.g., 3GPP TS 38.211 v15.0.0 (2017-12).

Zero-power (ZP) CSI-RS resources can also be configured to the UEs. As its name implies, the UE shall not assume that the gNB transmits on the REs occupied by the ZP CSI-RS configured to the UE.

SUMMARY

The solution presented herein solves problems associated with overlapping signals, which may lead to a wireless device measuring its own signals as interference. To address this problem, the solution presented herein enables the network node to send, and the wireless device to receive, a physical downlink channel on either a first set of resource elements scheduled for that wireless device, or on a set of resource elements that includes all of the first set except for a subset that was also scheduled for interference measurement resources. In so doing, the solution presented herein avoids the issues caused by the overlapping signals, and thus improves scheduling flexibility, reduces complexity, and reduces overhead.

One embodiment comprises a method performed by a wireless device of receiving, from a network node, a physical downlink channel. The method comprises receiving, from the network node, a first Downlink Control Information (DCI) scheduling the physical downlink channel on a first plurality of Resource Elements (REs). The method further comprises receiving, from the network node, a second DCI scheduling an aperiodic interference measurement resource on a second plurality of REs in the downlink for interference measurement. The second DCI comprises a request field, and the first plurality of REs includes at least a subset of the second plurality of REs. The method further comprises receiving, from the network node, the physical downlink channel on either the first plurality of REs or a third plurality of REs responsive to the request field. The third plurality of REs comprises the first plurality of REs excluding the subset of the second plurality of REs.

One embodiment comprises a wireless device comprising communication circuitry and processing circuitry. The communication circuitry is configured to transmit uplink signals to a network node and to receive downlink signals from the network node. The processing circuitry is configured to receive, from the network node, a first DCI scheduling the physical downlink channel on a first plurality of REs. The processing circuitry is further configured to receive, from the network node, a second DCI scheduling an aperiodic interference measurement resource on a second plurality of REs in the downlink for interference measurement. The second DCI comprises a request field, and the first plurality of REs includes at least a subset of the second plurality of REs. The processing circuitry is further configured to receive the physical downlink channel on either the first plurality of REs or a third plurality of REs responsive to the request field. The third plurality of REs comprises the first plurality of REs excluding the subset of the second plurality of REs.

One embodiment comprises a wireless device comprising a reception unit/circuit/module and a processor unit/circuit/module. The reception unit/circuit/module is configured to receive, from the network node, a first DCI scheduling the physical downlink channel on a first plurality of REs. The reception unit/circuit/module is further configured to receive, from the network node, a second DCI scheduling an aperiodic interference measurement resource on a second plurality of REs in the downlink for interference measurement. The second DCI comprises a request field, and the first plurality of REs includes at least a subset of the second plurality of REs. The reception unit/circuit/module is further configured to receive the physical downlink channel on either the first plurality of REs or a third plurality of REs responsive to the request field. The third plurality of REs comprises the first plurality of REs excluding the subset of the second plurality of REs.

One embodiment comprises a computer program product for controlling a wireless device. The computer program product comprises software instructions which, when executed by at least one processing circuit of the wireless device (300, 400), causes the wireless device to receive, from the network node, a first DCI scheduling the physical downlink channel on a first plurality of REs. The software instructions, when executed by the at least one processing circuitry further causes the wireless device to receive, from the network node, a second DCI scheduling an aperiodic interference measurement resource on a second plurality of REs in the downlink for interference measurement. The second DCI comprises a request field, and the first plurality of REs includes at least a subset of the second plurality of REs. The software instructions, when executed by the at least one processing circuitry further causes the wireless device to receive the physical downlink channel on either the first plurality of REs or a third plurality of REs responsive to the request field. The third plurality of REs comprises the first plurality of REs excluding the subset of the second plurality of REs. In one exemplary embodiment, a computer-readable medium comprises the computer program product. In one exemplary embodiment, the computer-readable medium comprises a non-transitory computer-readable medium.

One exemplary embodiment comprises a method performed by a base station of transmitting a physical downlink channel to a wireless device. The method comprises configuring a first DCI scheduling the physical downlink channel on a first plurality of REs. The method further comprises configuring a second DCI scheduling an aperiodic interference measurement resource on a second plurality of REs in the downlink for interference measurement, and transmitting, to the wireless device, the first and second DCIs. The second DCI comprises a request field, and the first plurality of REs includes at least a subset of the second plurality of REs. The method further comprises transmitting the physical downlink channel on either the first plurality of REs or a third plurality of REs in accordance with the request field. The third plurality of REs comprises the first plurality of REs excluding the subset of the second plurality of REs.

One embodiment comprises a network node comprising communication circuitry and processing circuitry. The communication circuitry is configured to transmit downlink signals to a wireless device and to receive uplink signals from the wireless device. The processing circuitry is configured to configure a first DCI scheduling the physical downlink channel on a first plurality of REs, and configure a second DCI scheduling an aperiodic interference measurement resource on a second plurality of REs in the downlink for interference measurement. The communication circuitry is configured to transmit, to the wireless device, the first and second DCIs. The second DCI comprises a request field, and the first plurality of REs includes at least a subset of the second plurality of REs. The communication circuitry is further configured to transmit the physical downlink channel on either the first plurality of REs or a third plurality of REs in accordance with the request field. The third plurality of REs comprises the first plurality of REs excluding the subset of the second plurality of REs.

One embodiment comprises a network node comprising a processor unit/circuit/module and a transmitter unit/circuit/module. The processor unit/circuit/module is configured to configure a first DCI scheduling the physical downlink channel on a first plurality of REs, and configure a second DCI scheduling an aperiodic interference measurement resource on a second plurality of REs in the downlink for interference measurement. The transmitter unit/circuit/module is configured to transmit, to the wireless device, the first and second DCIs. The second DCI comprises a request field, and the first plurality of REs includes at least a subset of the second plurality of REs. The transmitter unit/circuit/module is further configured to transmit the physical downlink channel on either the first plurality of REs or a third plurality of REs in accordance with the request field. The third plurality of REs comprises the first plurality of REs excluding the subset of the second plurality of REs.

One embodiment comprises a computer program product for controlling a network node. The computer program product comprises software instructions which, when executed by at least one processing circuit of the network node, causes the network node to configure a first DCI scheduling the physical downlink channel on a first plurality of REs, and to configure a second DCI scheduling an aperiodic interference measurement resource on a second plurality of REs in the downlink for interference measurement. The software instructions, when executed by the at least one processing circuit, further cause the network node to transmit, to the wireless device, the first and second DCIs. The second DCI comprises a request field, and the first plurality of REs includes at least a subset of the second plurality of REs. The software instructions, when executed by the at least one processing circuit, further cause the network node to transmit the physical downlink channel on either the first plurality of REs or a third plurality of REs in accordance with the request field. The third plurality of REs comprises the first plurality of REs excluding the subset of the second plurality of REs. In one exemplary embodiment, a computer-readable medium comprises the computer program product. In one exemplary embodiment, the computer-readable medium comprises a non-transitory computer-readable medium.

DETAILED DESCRIPTION

The PDSCH of the UE shall be rate matched around the ZP CSI-RS resources. ZP CSI-RS resources can be configured to the UEs for three purposes. Rate matching a physical channel around another physical channel or signal means that the complex-valued modulation symbols of the physical channel are not mapped to those resource elements which are occupied by the other physical channel or signal. Firstly, ZP CSI-RS can be configured to a UE in order to protect NZP CSI-RS transmissions from one or more neighboring cells. Secondly, ZP CSI-RS can be used for the purposes of indicating whether the PDSCH is mapped to CSI-IM. Thirdly, (aperiodic) ZP CSI-RS can be used to indicate that the UE shall rate match its PDSCH around a (beamformed) NZP CSI-RS intended for another UE to measure upon. It is mainly for this third purpose the aperiodic ZP CSI-RS field in the DL DCI is comprised.

In a typical use case, the network will not transmit anything on the REs occupied by the CSI-IM, so the UE can measure the inter-cell interference thereon. To indicate that the PDSCH is not mapped to the REs occupied by the CSI-IM, ZP CSI-RS is typically configured to overlap with the CSI-IM. As the CSI-IM and ZP CSI-RS resources typically overlap, the CSI-IM is colloquially referred to as a ZP CSI-RS based interference measurement resource (IMR). The IMR can be aperiodic (AP IMR), semi-persistent (SP IMR), or periodic IMR (P IMR). Note that in NR, an NZP CSI-RS can also be configured as an IMR.

Figure 1:
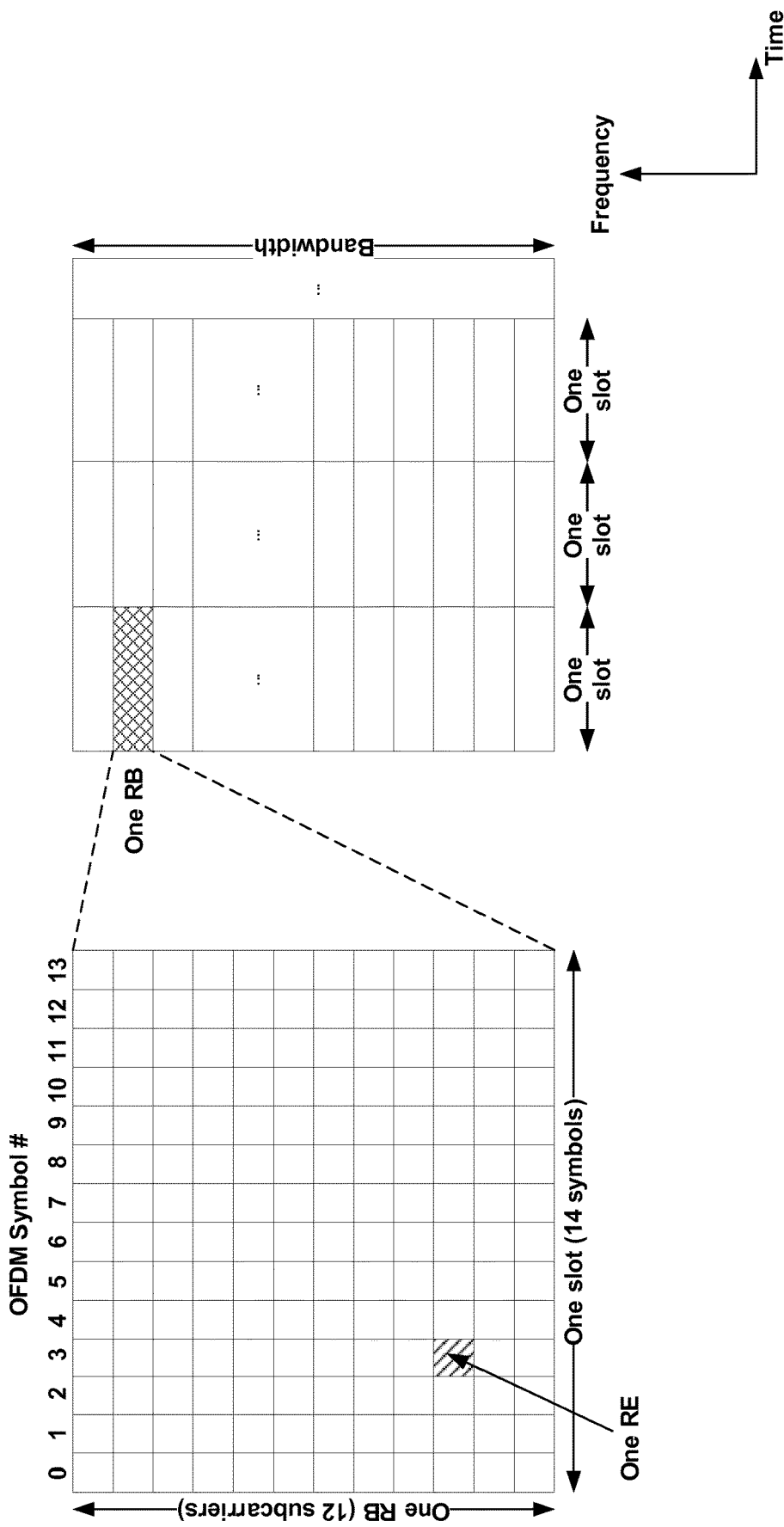
FIG. 1 shows a block diagram of NR physical resources.
Figure 2:
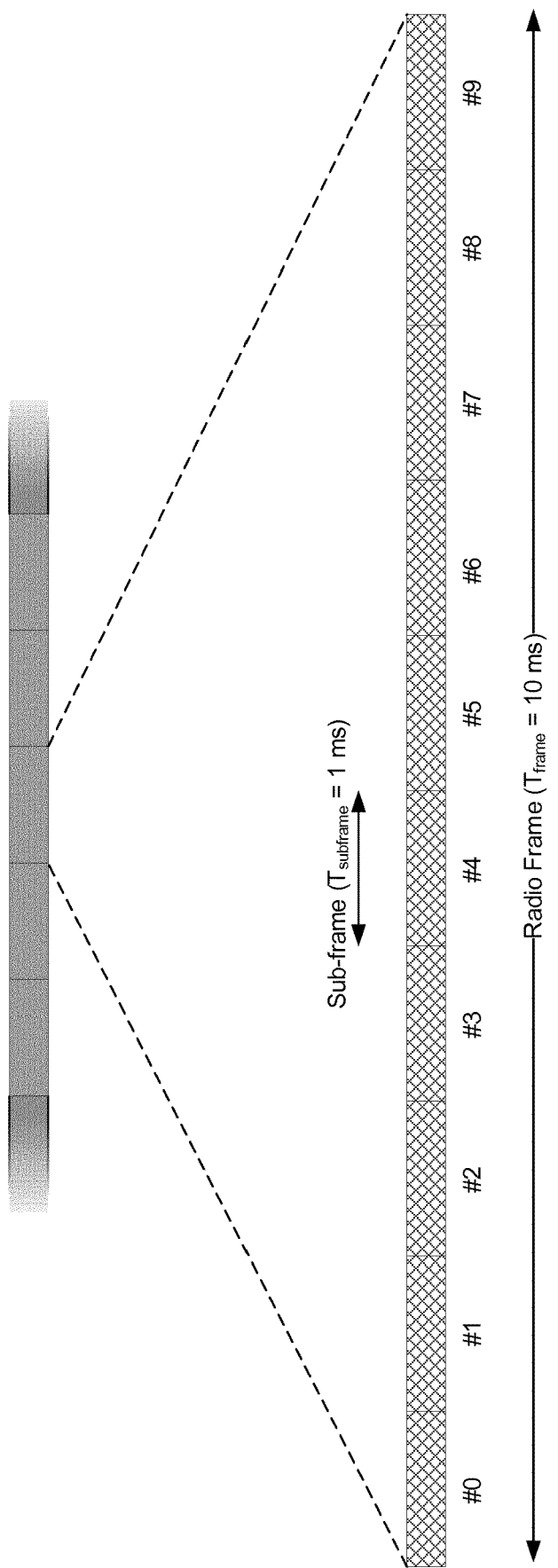
FIG. 2 shows NR time-domain structure with 15 kHz subcarrier spacing.
Figure 3:
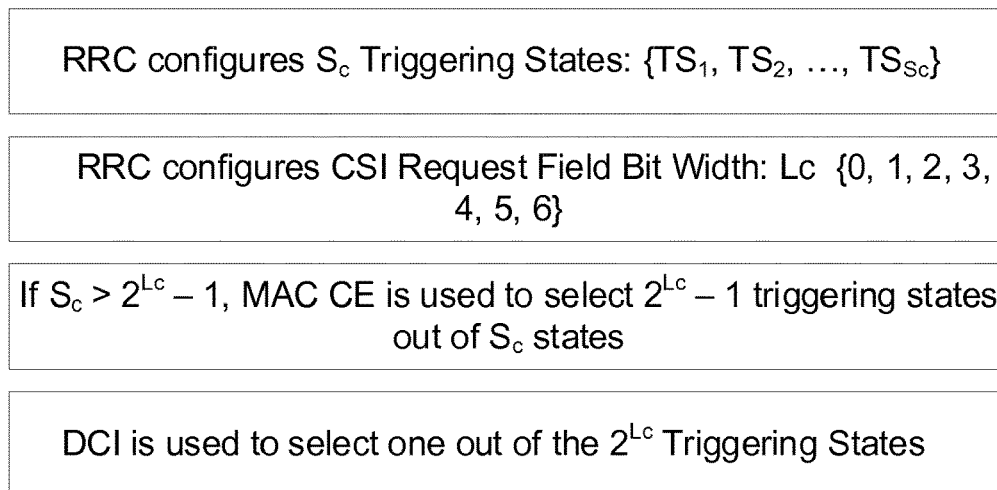
FIG. 3 shows an example of aperiodic CSI reporting.
Figure 3:
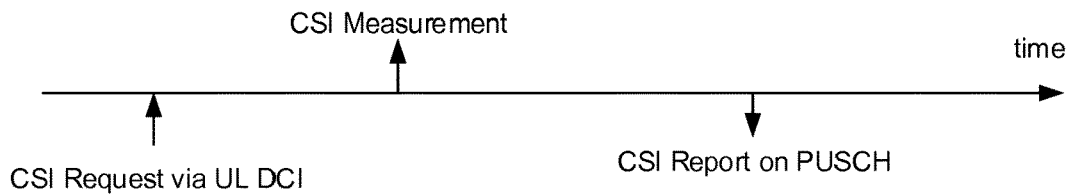
Figure 4:
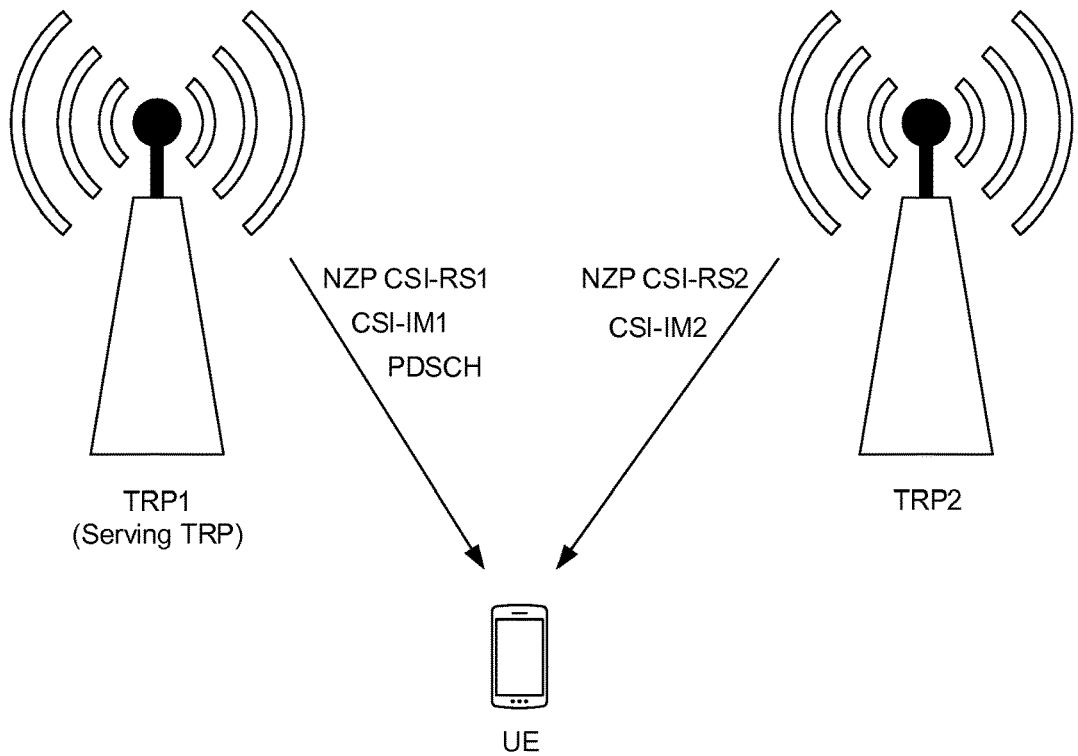
FIG. 4 shows an example of the solution presented herein according to exemplary embodiments.

It should be noted that ZP CSI-RS used for the purposes of indicating whether the PDSCH is mapped to CSI-IM REs is configured independently from CSI-IM. To illustrate the reasoning for this, consider the multiple TRP example for coordinated multiple point transmission (CoMP) shown in FIG. 4. In this example, the UE is currently being served by TRP1 and receives PDSCH from TRP1. TRP2 is a potential future serving cell. For CSI measurements corresponding to TRP1, the UE is configured with NZP CSI-RS1 and CSI-IM1 to measure the desired channel from TRP1 and the interference from TRP2, respectively. For CSI measurements corresponding to TRP2, the UE is configured with NZP CSI-RS2 and CSI-IM2 to measure the desired channel from TRP2 and the interference from TRP1, respectively. When the UE measures CSI corresponding to TRP2, the PDSCH from TRP1 that is currently received by the UE serves as the interference. Hence, in this case, PDSCH mapping should be allowed on REs corresponding to CSI-IM2 and a ZP CSI-RS does not need to be independently configured to overlap with CSI-IM2. For this reason, ZP CSI-RS and CSI-IM is configured independently. Currently, NR supports aperiodic ZP CSI-RS (AP ZP CSI-RS) and periodic ZP CSI-RS (P ZP CSI-RS).

Figure 5:
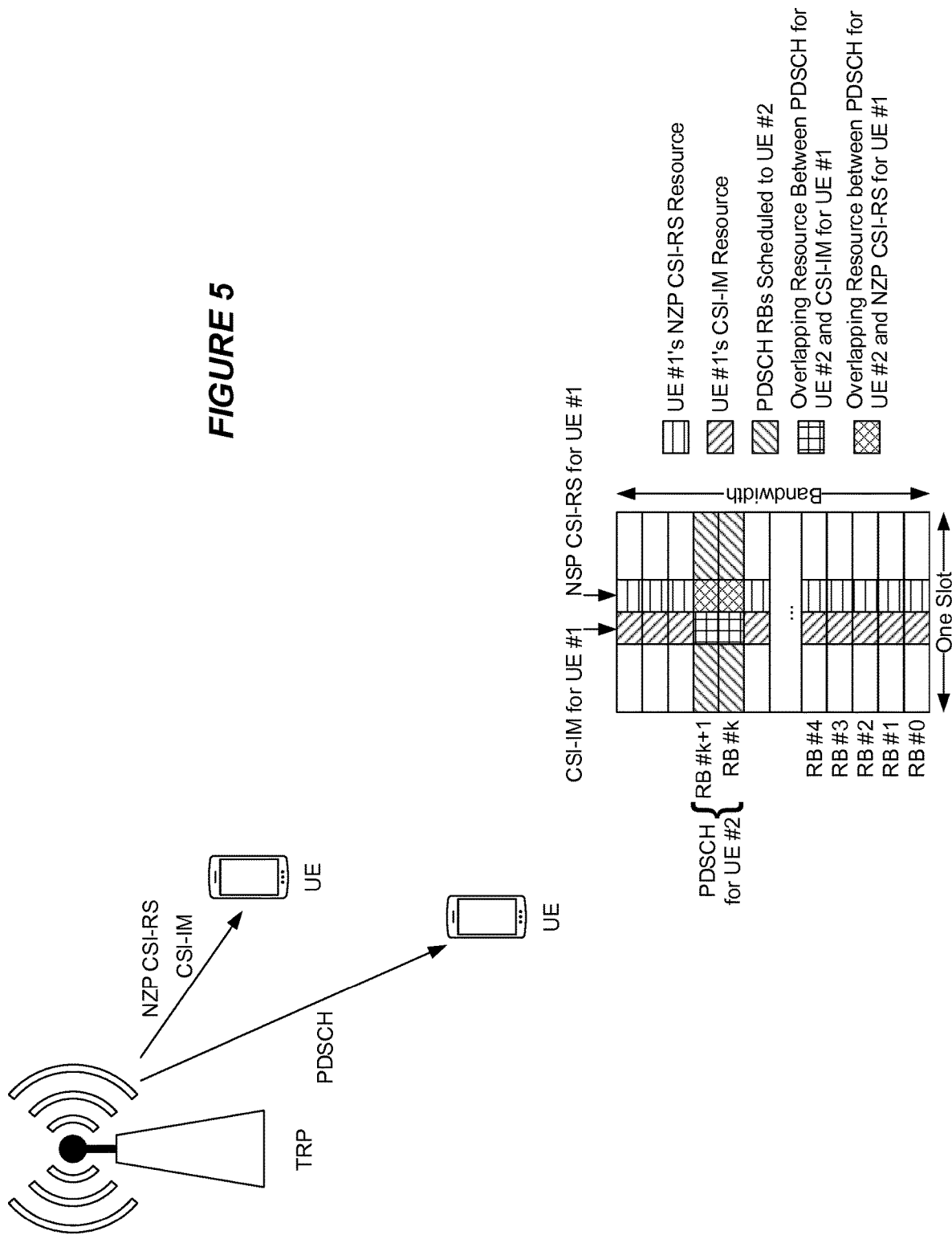
FIG. 5 shows another example of the solution presented herein according to exemplary embodiments.

FIG. 5 shows another exemplary scenario. In this scenario, when a first UE is indicated in a slot to measure CSI over an aperiodic NZP CSI-RS for channel and CSI-M for interference, and a second UE in the same cell is scheduled with PDSCH in the same slot, the second UE needs to be informed about the presence of the NZP CSI-RS and the CSI-IM in the slot so the second UE knows that the PDSCH is not transmitted (e.g., rate matched) in the REs occupied by the NZP CSI-RS and the CSI-IM. An example is shown in FIG. 5, where aperiodic NZP CSI-RS and CSI-IM for UE #1 is present in a slot while UE #2 is scheduled with PDSCH in the same slot. The overlapping resources between the PDSCH for UE #2 and the NZP CSI-RS and CSI-IM are not used for transmitting the PDSCH.

In NR, the following was agreed to be supported for pairing a Channel Measurement Resource (CMR) and an interference measurement resource (IMR):

For ZP CSI-RS based IMR (e.g., CSI-IM), the following combinations of P/SP/AP CMR and IMR are supported:

For A-CSI reporting,

|  | P CMR | S CMR | AP CMR |
|---|---|---|---|
| P IMR | YES | NO | NO |
| SP IMR | NO | YES | NO |
| AP IMR | NO | NO | YES |

That is, if aperiodic CMR (NZP CSI-RS) is used, aperiodic IMR is also be used.

In most practical implementations (not involving CoMP), it is beneficial to always configure overlapping CSI-IM and ZP CSI-RS resources so that the UE would not measure its own PDSCH as interference. This implies that for an UL DCI triggered aperiodic CMR/IMR (where the presence of a CSI-IM is dynamically indicated via the CSI request field in UL DCI) a corresponding aperiodic ZP CSI-RS would have to be indicated with the ZP CSI-RS trigger field in DL DCI, if a PDSCH is scheduled in the same slot as the CSI-IM occurs. This results in the following detrimental effects:

If a first UE receives a PDSCH and measures aperiodic CSI-IM in the same slot, the gNB cannot trigger aperiodic CSI-RS/CSI-IM measurements for a second UE in the same slot, as that would require the first UE to rate match its PDSCH around the second UEs CSI-RS/CSI-IM. This rate matching is not possible to indicate because the ZP CSI-RS trigger field is already used to indicate rate matching around the first UEs CSI-IM The codepoints of the ZP CSI-RS trigger field are exhausted as all possible CSI-IM positions must be possible to trigger, which limits the amount of possible CSI-RS positions that PDSCH can be rate matched around Both of these detrimental effects severely limit the scheduling flexibility of the gNB, increase implementation complexity, and may cause additional signalling overhead Certain aspects of the present disclosure and their embodiments may provide solutions to these or other challenges. Whether PDSCH shall be rate matched around is determined by the CSI request field in the UL DCI using one of the following options:

1. A trigger state of the CSI request field can optionally trigger a set of aperiodic ZP CSI-RS resources
2. The CSI-IM resource definition comprises a ZP CSI-RS resource identifier
3. The CSI-IM resource definition comprises a state indicating whether the CSI-IM resource shall be rate matched around by PDSCH
4. A rate matching indicator is included in the CSI measurement setting linked to a CSI-IM resource The following provides exemplary embodiments according to the solution presented herein.

1. A method, performed by a wireless device, for receiving a physical downlink channel, the method comprising:
   Obtaining an RRC message comprising a CSI measurement configuration comprising information how to interpret a CSI request field Receiving, from a network node, downlink control information (DCI) message scheduling the physical downlink channel on a first set of resource elements (REs)
   Receiving, from a network node, a downlink control information (DCI) message scheduling an uplink transmission, where the DCI message comprises a CSI request field and wherein the CSI request field indicates measurement on an aperiodic CSI-IM occupying a second set of REs, wherein at least a subset of the second set of REs is comprised in the first set of REs
   Determining, from the CSI request field in the DCI message scheduling the uplink transmission, if the downlink physical signal is present on the second set of REs
   Receiving the physical downlink channel based on the determined resource occupancy
2. The method of 1 where the determining comprises identifying if the CSI request field indicates that an aperiodic ZP CSI-RS resource is triggered.
3. The method of 1-2 where the CSI-IM resource configuration comprises and indication if the second set of REs shall be rate matched around by downlink physical signals.
4. The method of 3 where the indication comprises a ZP CSI-RS resource identifier as an optional information element (IE).
5. The method of 3 where the indication comprises a Boolean information element.
6. The method of 1-5 where the DCI message scheduling the physical downlink channel is the same DCI message that schedules the uplink transmission.
7. The method of 1-5 where the DCI message scheduling the physical downlink channel is a different DCI message from that which schedules the uplink transmission.
8. The method of 1-7 where the physical downlink channel is a Physical Downlink Shared Channel (PDSCH).
9. The method of 1-8 where the DCI message scheduling the physical downlink channel additionally comprises a ZP CSI-RS trigger field which determines the presence of the physical signal on another subset of the first set of REs.

Certain embodiments may provide one or more of the following technical advantage(s), e.g., increased scheduling flexibility of the gNB, lower implementation complexity, and/or lower signalling overhead.

In view of the embodiments above, the present disclosure generally includes the following embodiments, e.g., which may address one or more of the issues disclosed herein. One exemplary embodiment comprises a method performed by a wireless device of receiving, from a network node, a physical downlink channel. The method comprises receiving, from the network node, a first Downlink Control Information (DCI) message scheduling the physical downlink channel on a first plurality of Resource Elements (REs), and receiving, from the network node, a second DCI message scheduling an aperiodic Channel State Information Interference Measurement (CSI-IM) resource on a second plurality of REs in the downlink for CSI measurement. The second DCI message comprises a CSI request field. The first plurality of REs includes at least a subset of the second plurality of REs. In other words, a subset of the second plurality of REs overlaps with some portion of the first plurality of REs. Put another way, at least one of the second plurality of REs is part of the first plurality of REs. The method further comprises receiving the physical downlink channel on either the first plurality of REs or a third plurality of REs responsive to the CSI request field, where the third plurality of REs comprises the first plurality of REs excluding the subset of the second plurality of REs. In some examples the second plurality of REs is completely comprised within the first plurality of REs, i.e. the third plurality of REs may comprise the first plurality of REs excluding the second plurality of REs. As used herein "receiving a physical downlink channel" on a particular set of resource elements is synonymous with receiving (or decoding) data symbols carried by the physical downlink channel on that particular set of resource elements.

In some embodiments, the first and second DCI messages comprise the same DCI message, while in other embodiments the first and second DCI messages comprise different DCI messages.

In some embodiments, the wireless device receives the physical downlink channel on the third plurality of REs when the CSI request field indicates a triggering of an aperiodic zero power CSI reference signal (A-ZP CSI-RS) resource.

In some embodiments, the wireless device obtains a plurality of CSI measurement configurations from the network node, where the CSI request field indicates one of the plurality of CSI measurement configurations as a current CSI measurement configuration.

In some embodiments, the wireless device determines whether the current CSI measurement configuration for the wireless device comprises a rate matching indication indicating a rate matching of the physical downlink channel around the second plurality of REs. The rate matching indication may, for example, comprise a Boolean flag in an Information Element (IE) of the current CSI measurement configuration, where the wireless device receives the physical downlink channel on either the first plurality of REs or the third plurality of REs responsive to the Boolean flag.

In some embodiments, the method further comprises determining whether a CSI Interference Measurement (CSI-IM) resource configuration for the wireless device comprises a rate matching indication indicating a rate matching of the physical downlink channel around the second plurality of REs. The rate matching indication may, for example, comprise a Boolean flag in an Information Element (IE) of the CSI-IM resource configuration, where the wireless device receives the physical downlink channel on either the first plurality of REs or the third plurality of REs responsive to the Boolean flag. In other embodiments, the rate matching indication comprises a ZP CSI-RS resource identifier, where the wireless device receives the physical downlink channel on either the first or third plurality of REs responsive to the ZP CSI-RS resource identifier. In some embodiments, the ZP CSI-RS resource identifier is comprised in an optional Information Element (IE) of the CSI-IM resource configuration.

In some embodiments, the physical downlink channel comprises a Physical Downlink Shared Channel (PDSCH).

In some embodiments, the first DCI message further comprises a trigger field indicating rate matching for a subset of the first plurality of REs associated with another wireless device in communication with the network node, where the wireless device receives the physical downlink channel on the first plurality of REs, the third plurality of REs, or a fourth plurality of REs responsive to the CSI request field and the trigger field, the fourth plurality of REs comprising the first plurality of REs excluding the subset of the first plurality of REs, and where the subset of the first plurality of REs differs from the subset of the second plurality of REs. For example, a ZP CSI-RS field in the first DCI message may indicate rate matching around another wireless device's NZP CSI-RS/IM, limiting which of the first plurality of REs can be used for the physical downlink channel.

Another exemplary embodiment comprises a method performed by a base station of transmitting a physical downlink channel to a wireless device. The method comprises configuring a first Downlink Control Information (DCI) message scheduling the physical downlink channel on a first plurality of Resource Elements (REs), and configuring a second DCI message scheduling an aperiodic Channel State Information Interference Measurement (CSI-IM) resource on a second plurality of REs in the downlink for CSI measurement. The method further comprises transmitting, to the wireless device, the first and second DCI messages, where at least one of the first and second DCI messages comprises a CSI request field, and where the first plurality of REs includes at least a subset of the second plurality of REs. In other words, a subset of the second plurality of REs overlaps with some portion of the first plurality of REs. Put another way, at least one of the second plurality of REs is part of the first plurality of REs. The method further comprises transmitting the physical downlink channel to the wireless device on either the first plurality of REs or a third plurality of REs in accordance with the CSI request field, the third plurality of REs comprising the first plurality of REs excluding the subset of the second plurality of REs. In some examples the second plurality of REs is completely comprised within the first plurality of REs, i.e. the third plurality of REs may comprise the first plurality of REs excluding the second plurality of REs. As used herein "transmitting a physical downlink channel" on a particular set of resource elements is synonymous with transmitting data symbols carried by the physical downlink channel on that particular set of resource elements.

In some embodiments, the first and second DCI messages comprise the same DCI message, while in other embodiments, the first and second DCI messages comprise different DCI messages.

In some embodiments, the base station transmits the physical downlink channel on the third plurality of REs when the CSI request field indicates an aperiodic zero power CSI reference signal (A-ZP CSI-RS) resource in the CSI request field.

In some embodiments, the method further comprises sending a plurality of CSI measurement configurations to the wireless device, where the CSI request field indicates one of the plurality of CSI measurement configurations as a current CSI measurement configuration. In some embodiments, a rate matching indication is included in the current CSI measurement configuration for the wireless device, where the rate matching indication indicates a rate matching of the physical downlink channel around the second plurality of REs. In some embodiments, the rate matching indication comprises a Boolean flag in an Information Element (IE) of the current CSI measurement configuration, where the base station transmits the physical downlink channel on either the first plurality of REs or the third plurality of REs in accordance with the Boolean flag.

In some embodiments, the method further comprises including a rate matching indication in a CSI Interference Measurement (CSI-IM) resource configuration for the wireless device, where the rate matching indication indicating a rate matching of the physical downlink channel around the second plurality of REs. In some embodiments, the rate matching indication comprises a Boolean flag in an Information Element (IE) of the CSI-IM resource configuration, where the base station transmits the physical downlink channel on either the first plurality of REs or the third plurality of REs in accordance with the Boolean flag. In some embodiments, the rate matching indication comprises a ZP CSI-RS resource identifier, where the base station transmits the physical downlink channel on either the first plurality of REs or the third plurality of REs in accordance with the ZP CSI-RS resource identifier. In some embodiments, the ZP CSI-RS resource identifier is comprised in an optional Information Element (IE) of a CSI-IM configuration.

In some embodiments, the physical downlink channel comprises a Physical Downlink Shared Channel (PDSCH).

In some embodiments, the first DCI message further comprises a trigger field indicating rate matching for a subset of the first plurality of REs associated with another wireless device in communication with the base station, where the base station transmits the physical downlink channel on the first plurality of REs, the third plurality of REs, or a fourth plurality of REs in accordance with the CSI request field and the trigger field, where the fourth plurality of REs comprising the first plurality of REs excluding the subset of the first plurality of REs, and where the subset of the first plurality of REs differs from the subset of the second plurality of REs. For example, a ZP CSI-RS field in the first DCI message may indicate rate matching around another wireless device's NZP CSI-RS/IM, limiting which of the first plurality of REs the base station can use for transmitting the physical downlink channel.

Figure 7:
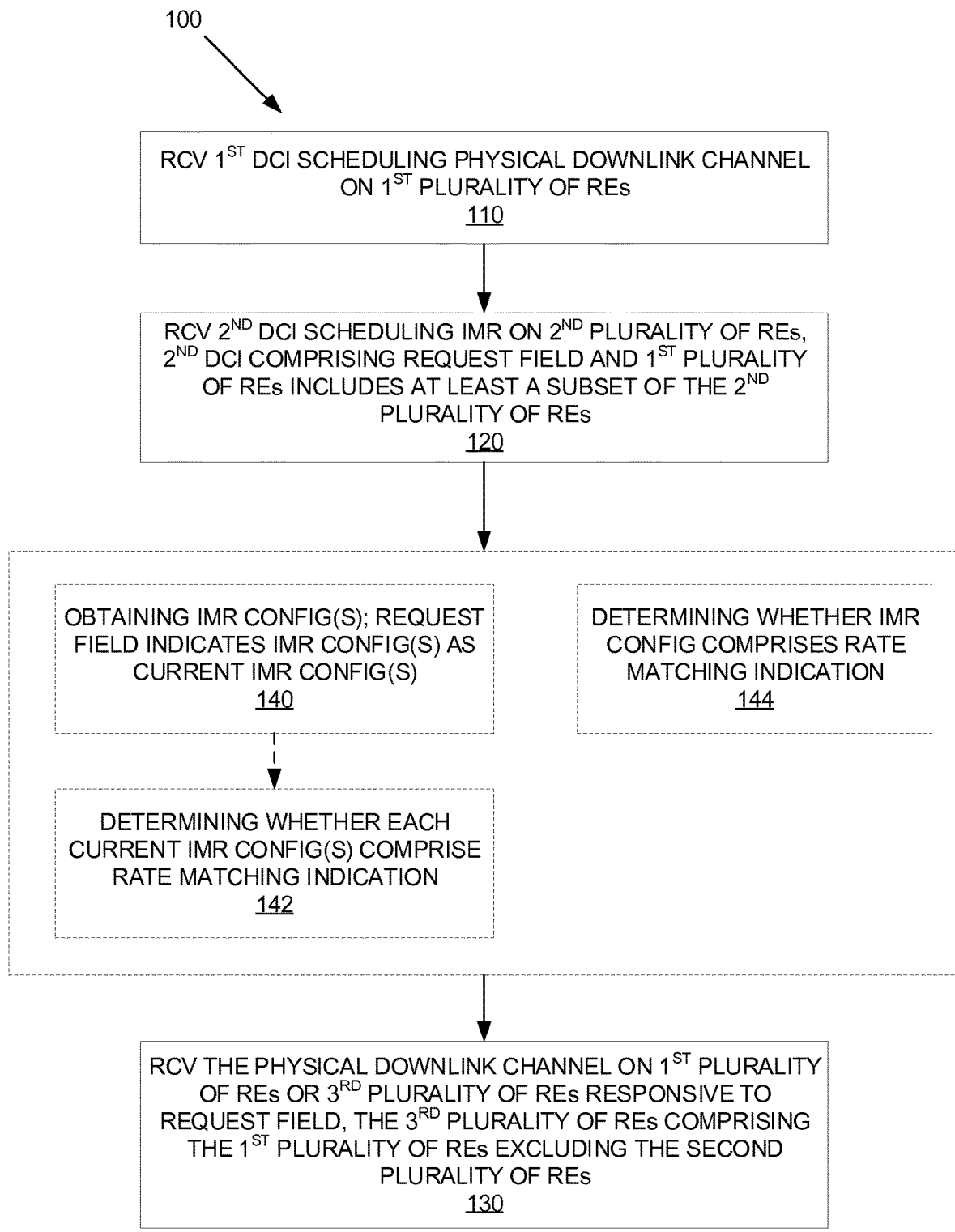
FIG. 7 shows an example flowchart according to exemplary embodiments.

FIG. 7 depicts a method 100 in accordance with particular embodiments. The method 100 includes a wireless device receiving, from the network node, a first DCI scheduling the physical downlink channel, e.g., a PDSCH, on a first plurality of REs (block 110). The method further includes the wireless device receiving, from the network node, a second DCI scheduling an aperiodic CSI-IM resource on a second plurality of REs in the downlink for CSI measurement, where the second DCI comprises a CSI request field, and where the first plurality of REs includes at least a subset of the second plurality of REs (block 120). The method further includes the wireless device receiving the physical downlink channel on either the first plurality of REs or a third plurality of REs responsive to the CSI request field, where third plurality of REs comprises the first plurality of REs excluding the subset of the second plurality of REs (block 130). In some embodiments, the method 100 may further comprise obtaining a plurality of interference measurement resource configurations from the network node (optional block 140). For this embodiment, the request field indicates at least one of the plurality of interference measurement resource configurations as one or more current interference measurement resource configurations. Further, for this embodiment, the method 100 may further comprise determining, for each of the one or more current interference measurement resource configurations, whether the current interference measurement resource configuration for the wireless device comprises a rate matching indication indicating a rate matching of the physical downlink channel around the second plurality of REs (optional block 144). In other embodiments, the method 100 may further comprise determining whether an interference measurement resource configuration for the wireless device comprises a rate matching indication indicating a rate matching of the physical downlink channel around the second plurality of REs (optional block 144). As used herein "receiving a physical downlink channel" on a particular set of resource elements is synonymous with receiving (or decoding) a message carried by the physical downlink channel on that particular set of resource elements.

In one exemplary embodiment, the first and second DCIs comprise the same DCI message, e.g., a common DCI message. In another exemplary embodiment, the first and second DCIs comprise different DCI messages.

Figure 8:
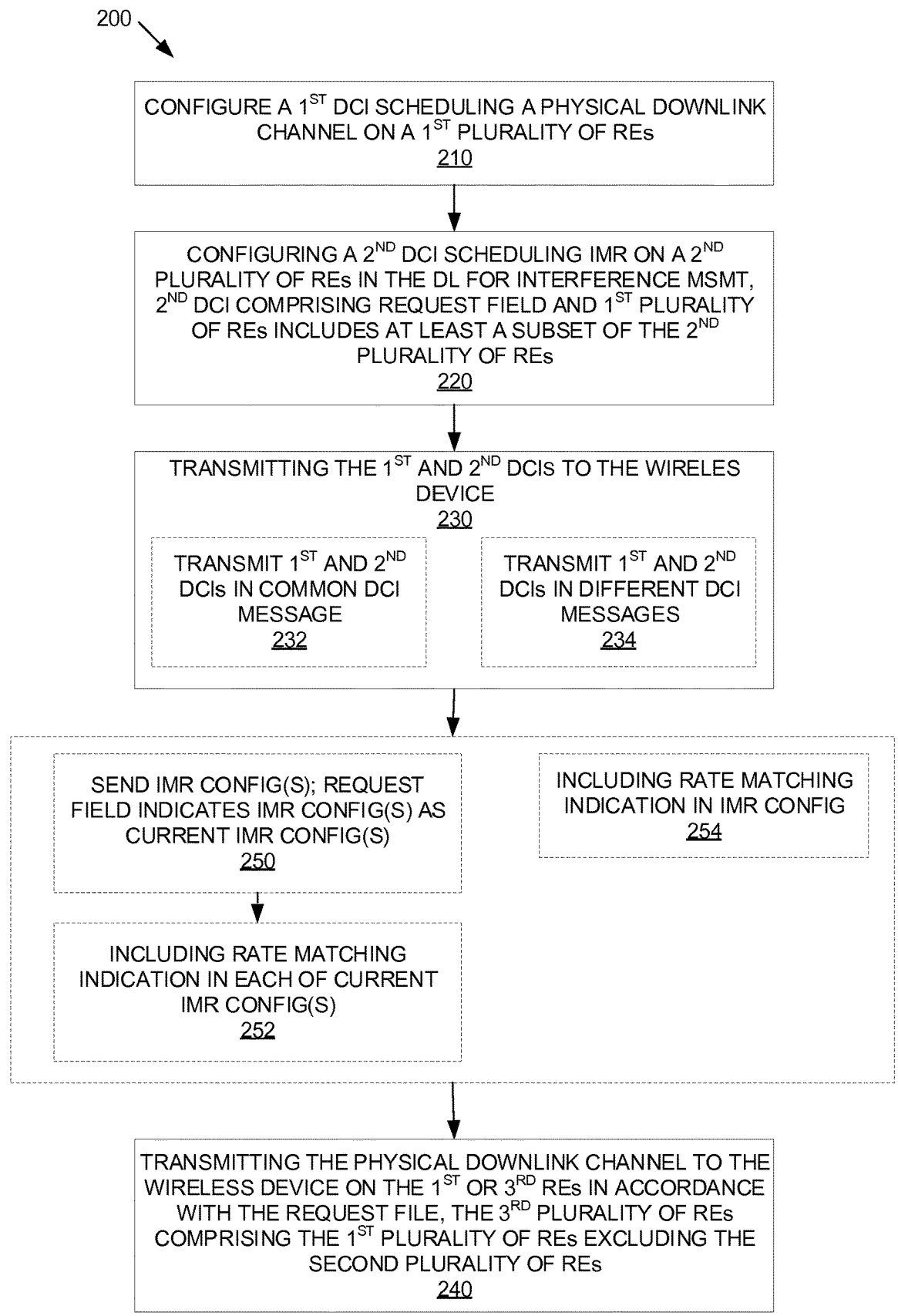
FIG. 8 shows another example flowchart according to exemplary embodiments.

FIG. 8 depicts a method 200 in accordance with other particular embodiments. The method 200 includes a network node configuring a first DCI scheduling the physical downlink channel, e.g., a PDSCH, on a first plurality of REs (block 210). The method further includes the network node configuring a second DCI scheduling an aperiodic CSI-IM resource on a second plurality of REs in the downlink for CSI measurement, where the second DCI comprises a CSI request field, and where the first plurality of REs includes at least a subset of the second plurality of REs (block 220). The method further includes the network node transmitting, to the wireless device, the first and second DCIs (block 230). The method further includes the network node transmitting the physical downlink channel to the wireless device on either the first plurality of REs or a third plurality of REs in accordance with the CSI request field, where the third plurality of REs comprises the first plurality of REs excluding the subset of the second plurality of REs (block 240). In one exemplary embodiment, the network node may transmit the first and second DCIs in the same DCI message, e.g., a common DCI message (optional block 232). In another exemplary embodiment, the network node may transmit the first and second DCIs in different DCI messages (optional block 234). In some embodiments, the method 200 may further comprise sending a plurality of interference measurement resource configurations to the wireless device (optional block 250). For this embodiment, the request field indicates at least one of the plurality of interference measurement resource configurations as one or more current interference measurement resource configuration (optional block 252). Further, for this embodiment, the method 200 may further comprise including, for each of the one or more current interference measurement resource configurations, a rate matching indication in the current interference measurement resource configuration for the wireless device (optional block 254), where the rate matching indication indicates a rate matching of the physical downlink channel around the second plurality of REs. In some embodiments, the method 200 may further comprise including a rate matching indication in an interference measurement resource configuration for the wireless device (optional block 254), where the rate matching indication indicates a rate matching of the physical downlink channel around the second plurality of REs. As used herein "transmitting a physical downlink channel" on a particular set of resource elements is synonymous with transmitting a message carried by the physical downlink channel on that particular set of resource elements.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 9:
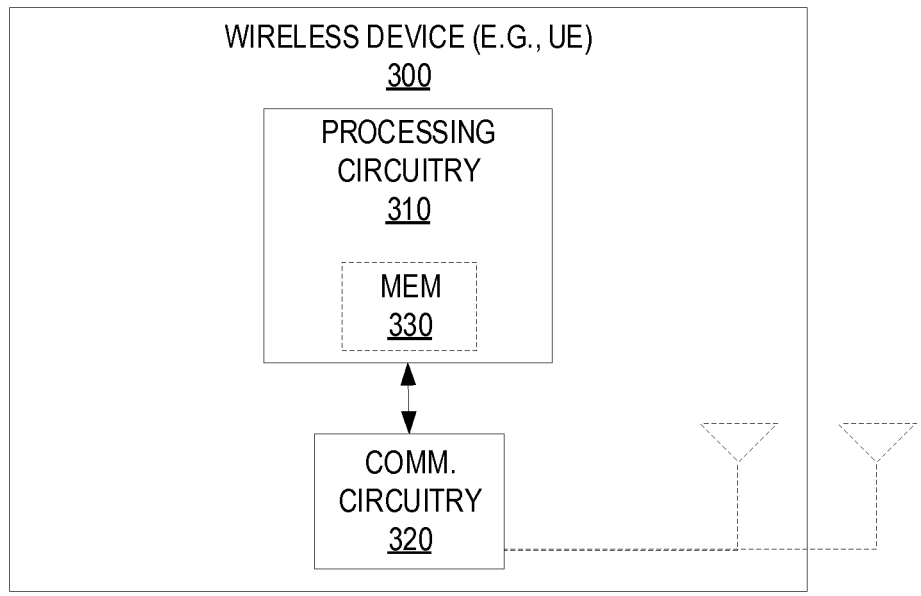
FIG. 9 shows a block diagram of a wireless device according to exemplary embodiments.

FIG. 9 for example illustrates a wireless device 300 as implemented in accordance with one or more embodiments. As shown, the wireless device 300 includes processing circuitry 310 and communication circuitry 320. The communication circuitry 320 (e.g., radio circuitry) is configured to transmit and/or receive information to and/or from one or more other nodes, e.g., via any communication technology. Such communication may occur via one or more antennas that are either internal or external to the wireless device 300. The processing circuitry 310 is configured to perform processing described above, such as by executing instructions stored in memory 330. The processing circuitry 310 in this regard may implement certain functional means, units, or modules.

Figure 10:
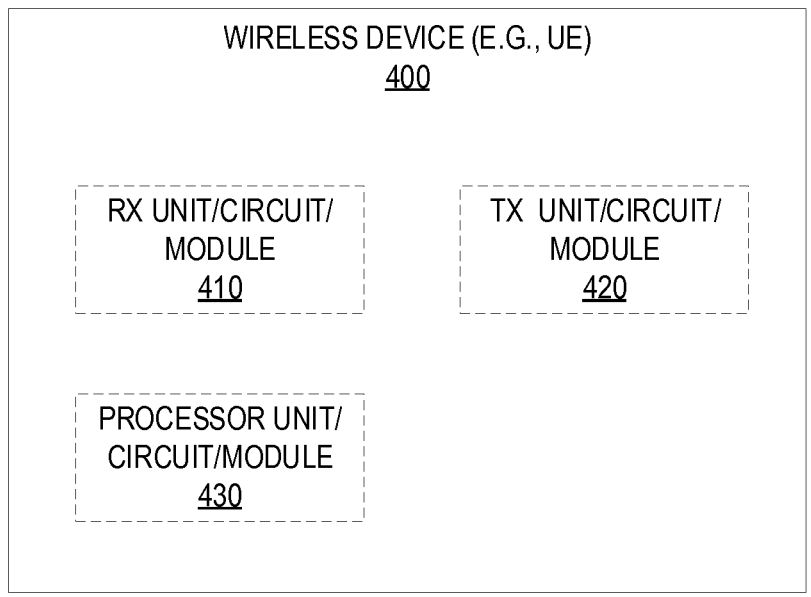
FIG. 10 shows a block diagram of a wireless device according to exemplary embodiments.
Figure 13:
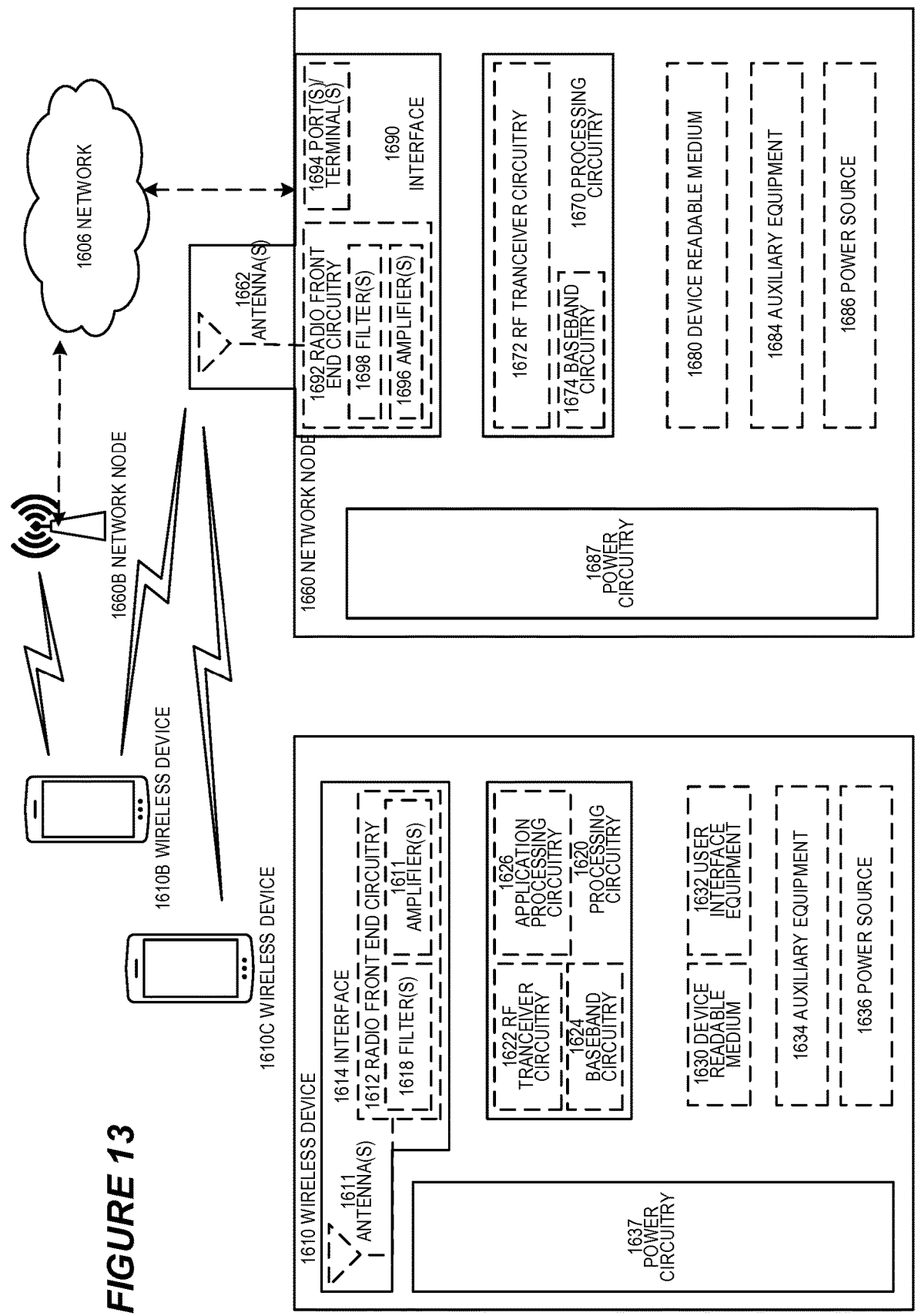
FIG. 13 shows an exemplary wireless network applicable to the solution presented herein.

FIG. 10 illustrates a schematic block diagram of a wireless device 400 in a wireless network according to still other embodiments (for example, the wireless network shown in FIG. 13). As shown, the wireless device 400 implements various functional means, units, or modules, e.g., via the processing circuitry 310 in FIG. 9 and/or via software code. These functional means, units, or modules, e.g., for implementing the method(s) herein, include for example: receiver (RX) unit/circuit/module 410, transmitter (TX) unit/circuit/module 420, and processor unit/circuit/module 430. The RX unit/circuit/module 410 is configured to receive, from a network node, a first DCI scheduling the physical downlink channel, e.g., a PDSCH, on a first plurality of REs, and a second DCI scheduling an aperiodic CSI-IM resource on a second plurality of REs in the downlink for CSI measurement. The second DCI comprises a CSI request field, and the first plurality of REs includes at least a subset of the second plurality of REs. The RX unit/circuit/module 410 is further configured to receive the physical downlink channel on either the first plurality of REs or a third plurality of REs responsive to the CSI request field, where third plurality of REs comprises the first plurality of REs excluding the subset of the second plurality of REs. In some embodiments, the processor unit/circuit/module 430 is configured to generate a CSI report in accordance with the DCIs, and the TX unit/circuit/module 420 is configured to send the CSI report to the network node using resources allocated in the second DCI message. In some embodiments, the processor unit/circuit/module 430 is further configured to determining whether the current CSI measurement configuration for the wireless device comprises a rate matching indication, e.g., a Boolean flag, indicating a rate matching of the physical downlink channel around the second plurality of REs. In some embodiments, the processor unit/circuit/module 430 is further configured to determine whether a CSI-IM resource configuration for the wireless device comprises a rate matching indication, e.g., a Boolean flag or a ZP CSI-RS resource identifier, indicating a rate matching of the physical downlink channel around the second plurality of REs.

Figure 11:
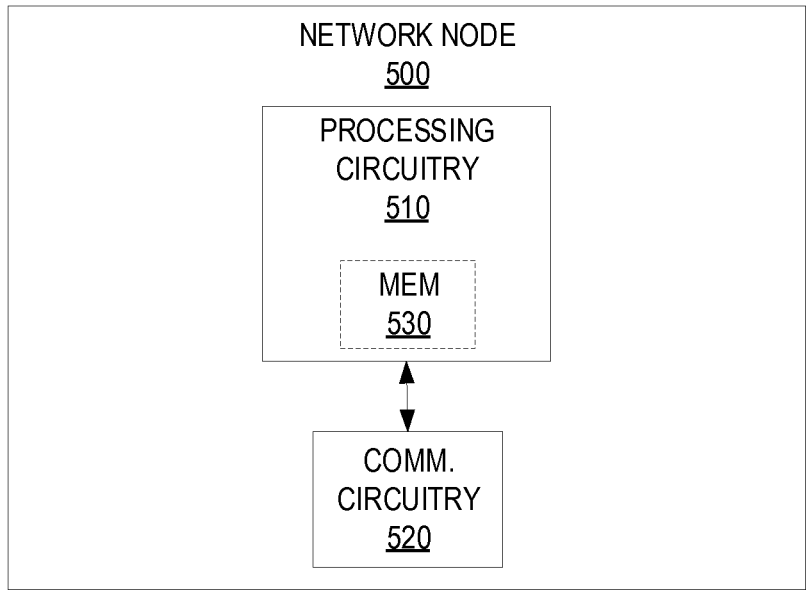
FIG. 11 shows a block diagram of a network node according to exemplary embodiments.

FIG. 11 illustrates a network node 500 as implemented in accordance with one or more embodiments. As shown, the network node 500 includes processing circuitry 510 and communication circuitry 520. The communication circuitry 520 is configured to transmit and/or receive information to and/or from one or more other nodes, e.g., via any communication technology. The processing circuitry 510 is configured to perform processing described above, such as by executing instructions stored in memory 530. The processing circuitry 510 in this regard may implement certain functional means, units, or modules.

Figure 12:
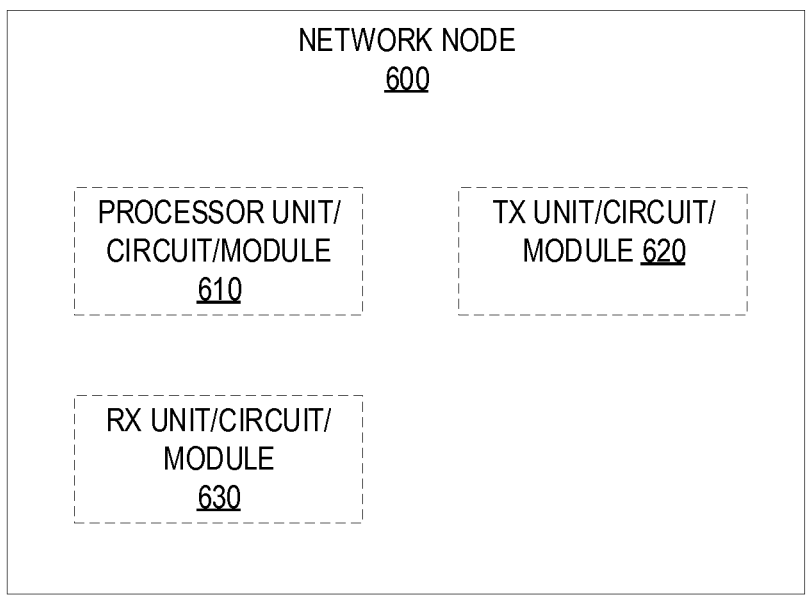
FIG. 12 shows a block diagram of a network node according to exemplary embodiments.

FIG. 12 illustrates a schematic block diagram of a network node 600 in a wireless network according to still other embodiments (for example, the wireless network shown in FIG. 13). As shown, the network node 600 implements various functional means, units, or modules, e.g., via the processing circuitry 510 in FIG. 11 and/or via software code. These functional means, units, or modules, e.g., for implementing the method(s) herein, include for example: a processor unit/circuit/module 610, a transmitter (TX) unit/circuit/module 620, and a receiver (RX) unit/circuit/module 630. The processor unit/circuit/module 610 is configured to configure a first DCI scheduling the physical downlink channel on a first plurality of REs, and to configure a second DCI scheduling an aperiodic CSI-IM resource on a second plurality of REs in the downlink for CSI measurement. The second DCI comprises a CSI request field, and the first plurality of REs includes at least a subset of the second plurality of REs. The transmitter unit/circuit/module 620 is configured to transmit, to the wireless device, the first and second DCIs. The TX unit/circuit/module 620 is further configured to transmit the physical downlink channel on either the first plurality of REs or a third plurality of REs in accordance with the CSI request field, where the third plurality of REs comprise the first plurality of REs excluding the subset of the second plurality of REs. In some embodiments, the RX unit/circuit/module 630 is configured to receive the CSI report(s) generated by the wireless device in response to the transmitted DCIs and physical downlink channel. In some embodiments, the processor unit/circuit/module 610 is further configured to include a rate matching indication, e.g., a Boolean flag, in the current CSI measurement configuration for the wireless device, the rate matching indication indicating a rate matching of the physical downlink channel around the second plurality of REs. In some embodiments, the processor unit/circuit/module 610 is further configured to include a rate matching indication, e.g., a Boolean flag or a ZP CSI-RS resource identifier, in a CSI-IM resource configuration for the wireless device, the rate matching indication indicating a rate matching of the physical downlink channel around the second plurality of REs.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Whether the UE shall rate match its PDSCH around the CSI-IM is part of the CSI hypothesis, and therefore the solution presented herein proposes using the CSI request field to infer this behavior.

In one embodiment, the possible rate matching around the aperiodic CSI-IM is conveyed by associating each RRC configured trigger state with a set of aperiodic ZP CSI-RS resources. Upon receiving the DCI triggering the aperiodic CSI report and measurement on the aperiodic CSI-RS/CSI-IM, the UE is additionally indicated with the set of ZP CSI-RS resource. Upon receiving this indication, the UE is made aware that any physical channel which it is scheduled with in the same slot shall be rate matched around the REs that the ZP CSI-RS resources indicate. In some embodiments, the CSI request field is comprised in an UL DCI scheduling a PUSCH, while the downlink transmission of the PDSCH is scheduled by a DL DCI. In other embodiments, the CSI request field is comprised in a DL DCI, which may also schedule a PDSCH.

In a typical embodiment, the set of aperiodic ZP CSI-RS would indicate rate matching around the same set of REs as the triggered aperiodic CSI-IM occupy. For example, each ZP CSI-RS resource in the set may have a one-to-one mapping with a triggered CSI-IM resource. In other embodiments, each triggering state is associated with a single ZP CSI-RS resource rather than a set of ZP CSI-RS resources.

In another embodiment, each CSI triggering state is associated with multiple ZP CSI-RS resources via RRC. For a UE in a given slot, a CSI triggering state is selected by the CSI request field in UL DCI. If the UE receives a DL DCI to schedule a PDSCH in the same slot, the ZP CSI-RS trigger field selects one of the ZP CSI-RS resources associated with the selected CSI triggering state. In one particular variant of this embodiment, for a ZP CSI-RS trigger field size of G bits, $2^G-1$ ZP CSI-RS resources are associated with the selected CSI trigger state. Hence, $2^G-1$ codepoints of the ZP CSI-RS trigger field can be used to select $2^G-1$ ZP CSI-RS resources associated with the selected CSI trigger state, where one codepoint of ZP CSI-RS trigger field selects one ZP CSI-RS resource. One codepoint of the ZP CSI-RS trigger field corresponds to no ZP CSI-RS being selected for rate matching.

As it may be typical to associate one CSI-IM resource with one ZP CSI-RS resource, the association between CSI-IM and ZP CSI-RS is in some embodiments given in the CSI-IM resource definition. In one such embodiment, the CSI-IM-Resource IE in the RRC configuration comprises an optional IE associated-ZP-CSI-RS-Resource-/d, which indicates an associated ZP CSI-RS resource. When the CSI-IM resource is triggered by the CSI request field, any associated ZP CSI-RS resource is triggered as well, and PDSCH rate matching may be inferred by the UE. As the IE is optional, some CSI-IM resources may be associated with a ZP CSI-RS resource while others are not. Exemplary ASN.1 code for this embodiment is provided below:

```
CSI-IM-Resource ::=                       SEQUENCE {
    csi-IM-ResourceId                     CSI-IM-ResourceId,
        associated-ZP-CSI-RS-Resource-Id          ZP-CSI-RS-Resource-Id
    OPTIONAL,
        -- The resource element pattern for the CSI-IM resource
        -- Corresponds to L1 parameter 'CSI-IM-RE-pattern' (see 38.214,
    section 5.2.2.3.4)
        csi-IM-ResourceElementPattern                 ENUMERATED {pattern2-2,
    pattern4-1),
        -- OFDM symbol and subcarrier occupancy of the CSI-IM resource
    within a slot
        -- Corresponds to L1 parameter 'CSI-IM-ResourceMapping' (see
    38.214, section 5.2.2.3.4)
        resourceMapping                       TYPE_FFS!      OPTIONAL,
}
``` ments, the association of a set of aperiodic ZP CSI-RS resources to a trigger state is optional, so that both CoMP and non-CoMP behavior can be accomplished by different configurations. In some implementations, it may be desirable to trigger CSI reports for different CoMP hypotheses, and so, the number of ZP CSI-RS resources in the triggered set may be smaller than the number of triggered CSI-IM resources, so that the REs of some CSI-IM resources is rate matched around while others are not. In further embodiments As a ZP CSI-RS resource associated with a CSI-IM resource typically would cover the same REs, it may be unnecessary to indicate these REs both in the CSI-IM definition as well as in the ZP CSI-RS definition. Therefore, in one exemplary embodiment, whether the PDSCH shall be rate matched around a CSI-IM resource is indicated with a Boolean flag, e.g., the flag isRateMatchedAround in the CSI-IM resource definition, as is illustrated with the exemplary

```
ASN.1 code below:
CSI-IM-Resource ::=                       SEQUENCE {
    csi-IM-ResourceId                     CSI-IM-ResourceId,
    isRateMatchedAround                        BOOLEAN,
    -- The resource element pattern for the CSI-IM resource
    -- Corresponds to L1 parameter 'CSI-IM-RE-pattern' (see 38.214, section 5.2.2.3.4)
        csi-IM-ResourceElementPattern                 ENUMERATED {pattern2-2, pattern4-1),
```

```
-- OFDM symbol and subcarrier occupancy of the CSI-IM resource within a slot
-- Corresponds to L1 parameter 'CSI-IM-ResourceMapping' (see 38.214, section 5.2.2.3.4)
    resourceMapping                          TYPE_FFS!          OPTIONAL,
}
```

In some scenarios, a CSI-IM may be linked to multiple CSI report settings and rate matching around the CSI-IM is performed in a subset of the CSI report settings but not in the others. For example, if a CSI report setting is for multi-TRP transmission in which a PDSCH transmitted from a first TRP is considered as interference to the PDSCH transmitted from a second TRP, both to the same UE, CSI-IM may be used to measure PDSCH interference transmitted from the other TRP and rate matching is not performed. On the other hand, if a CSI report setting linked to the same CSI-IM is for measuring inter-cell interference, then a PDSCH to the UE in the same slot as the CSI-IM is rate matched around the CSI-IM. Thus, in another embodiment, whether rate matching around a CSI-IM is performed by a UE is indicated in each CSI measurement setting which links a CSI report setting and a CSI resource setting in which the CSI-IM is defined. Exemplary ASN.1 code for this embodiment is shown below:

```
CSI-MeasIdToAddMod ::=         SEQUENCE {
    csi-measId                     CSI-MeasId,
    csi-RS-resourceConfigId            CSI-RS-ConfigurationId,
    csi-reportConfigId             CSI-ReportConfigId,
    isRateMatchedAroundCSI-IM          BOOLEAN,
    measQuantity               ENUMERATED {channel, interference}
}
```

Figure 6:
FIG. 6 shows another example of the solution presented herein according to exemplary embodiments.

FIG. 6 shows a mode of operation made possible by the solution presented herein. In slot n, UE #1 has been scheduled with a PDSCH by a DL DCI (which was received either in slot n or a previous slot). UE #1 is also triggered with an aperiodic CSI report and measurement on aperiodic CSI-RS and CSI-IM, occurring in slot n, using an UL DCI. The UL DCI also schedules the UE for PUSCH transmission in slot n+3, whereon the aperiodic CSI report is carried. In slot n, UE #2 is also triggered with an aperiodic CSI report and measurement on another aperiodic CSI-RS and CSI-IM, also occurring in slot n, by another UL DCI. That UL DCI also schedules a PUSCH transmission for UE #2 whereon the CSI report shall be carried.

Upon reception of the UL DCI scheduling PUSCH for UE #1, UE #1 determines from the CSI request field that aperiodic CSI-RS and CSI-IM is triggered in slot n, and therefore knows that the PDSCH scheduled by the DL DCI shall be rate matched around the CSI-RS RE, and by applying the solution presented herein, may infer that the PDSCH shall be rate matched around the aperiodic CSI-IM as well.

Because UE #1 is not aware of the aperiodically triggered CSI-IM and CSI-RS for UE #2, it is explicitly indicated that its PDSCH shall be rate matched around the REs that UE #2's CSI-RS and CSI-IM occupy. This explicit indication may be provided in the ZP CSI-RS trigger in the DL DCI that schedules UE #1's PDSCH. Because the ZP CSI-RS field does not have to be used for rate matching around CSI-IM #1 according to the solution presented herein, this operation is possible.

Note that as UE #2 is not scheduled to receive a PDSCH in slot n, it does not need to be informed about the presence of CSI-RS #1 and CSI-IM #1, and no ZP CSI-RS indication for UE #2 is needed.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 1606, network nodes 1660 and 1660b, and wireless devices 1610, 1610b, and 1610c. In practice, a wireless network may further include any additional elements suitable to support communication between wireless devices or between a wireless device and another communication device, such as a landline telephone, a service provider, or any other network node or end device. Of the illustrated components, network node 1660 and wireless device 1610 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1606 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1660 and wireless device 1610 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points) and base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 1660 includes processing circuitry 1670, device readable medium 1680, interface 1690, auxiliary equipment 1684, power source 1686, power circuitry 1687, and antenna 1662. Although network node 1660 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1660 are depicted as single boxes located within a larger box, or nested within multiple boxes, in practice, a network node may comprise multiple different physical components that make up a single illustrated component (e.g., device readable medium 1680 may comprise multiple separate hard drives as well as multiple RAM modules).

Similarly, network node 1660 may be composed of multiple physically separate components (e.g., a NodeB component and a RNC component, or a BTS component and a BSC component, etc.), which may each have their own respective components. In certain scenarios in which network node 1660 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 1660 may be configured to support multiple radio access technologies (RATs). In such embodiments, some components may be duplicated (e.g., separate device readable medium 1680 for the different RATs) and some components may be reused (e.g., the same antenna 1662 may be shared by the RATs). Network node 1660 may also include multiple sets of the various illustrated components for different wireless technologies integrated into network node 1660, such as, for example, GSM, WCDMA, LTE, NR, WiFi, or Bluetooth wireless technologies. These wireless technologies may be integrated into the same or different chip or set of chips and other components within network node 1660.

Processing circuitry 1670 is configured to perform any determining, calculating, or similar operations (e.g., certain obtaining operations) described herein as being provided by a network node. These operations performed by processing circuitry 1670 may include processing information obtained by processing circuitry 1670 by, for example, converting the obtained information into other information, comparing the obtained information or converted information to information stored in the network node, and/or performing one or more operations based on the obtained information or converted information, and as a result of said processing making a determination.

Processing circuitry 1670 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1660 components, such as device readable medium 1680, network node 1660 functionality. For example, processing circuitry 1670 may execute instructions stored in device readable medium 1680 or in memory within processing circuitry 1670. Such functionality may include providing any of the various wireless features, functions, or benefits discussed herein. In some embodiments, processing circuitry 1670 may include a system on a chip (SOC).

In some embodiments, processing circuitry 1670 may include one or more of radio frequency (RF) transceiver circuitry 1672 and baseband processing circuitry 1674. In some embodiments, radio frequency (RF) transceiver circuitry 1672 and baseband processing circuitry 1674 may be on separate chips (or sets of chips), boards, or units, such as radio units and digital units. In alternative embodiments, part or all of RF transceiver circuitry 1672 and baseband processing circuitry 1674 may be on the same chip or set of chips, boards, or units In certain embodiments, some or all of the functionality described herein as being provided by a network node, base station, eNB or other such network device may be performed by processing circuitry 1670 executing instructions stored on device readable medium 1680 or memory within processing circuitry 1670. In alternative embodiments, some or all of the functionality may be provided by processing circuitry 1670 without executing instructions stored on a separate or discrete device readable medium, such as in a hard-wired manner. In any of those embodiments, whether executing instructions stored on a device readable storage medium or not, processing circuitry 1670 can be configured to perform the described functionality. The benefits provided by such functionality are not limited to processing circuitry 1670 alone or to other components of network node 1660, but are enjoyed by network node 1660 as a whole, and/or by end users and the wireless network generally.

Device readable medium 1680 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1670. Device readable medium 1680 may store any suitable instructions, data or information, including a computer program, software, an application including one or more of logic, rules, code, tables, etc. and/or other instructions capable of being executed by processing circuitry 1670 and, utilized by network node 1660. Device readable medium 1680 may be used to store any calculations made by processing circuitry 1670 and/or any data received via interface 1690. In some embodiments, processing circuitry 1670 and device readable medium 1680 may be considered to be integrated.

Interface 1690 is used in the wired or wireless communication of signalling and/or data between network node 1660, network 1606, and/or wireless devices 1610. As illustrated, interface 1690 comprises port(s)/terminal(s) 1694 to send and receive data, for example to and from network 1606 over a wired connection. Interface 1690 also includes radio front end circuitry 1692 that may be coupled to, or in certain embodiments a part of, antenna 1662. Radio front end circuitry 1692 comprises filters 1698 and amplifiers 1696. Radio front end circuitry 1692 may be connected to antenna 1662 and processing circuitry 1670. Radio front end circuitry may be configured to condition signals communicated between antenna 1662 and processing circuitry 1670. Radio front end circuitry 1692 may receive digital data that is to be sent out to other network nodes or wireless devices via a wireless connection. Radio front end circuitry 1692 may convert the digital data into a radio signal having the appropriate channel and bandwidth parameters using a combination of filters 1698 and/or amplifiers 1696. The radio signal may then be transmitted via antenna 1662. Similarly, when receiving data, antenna 1662 may collect radio signals which are then converted into digital data by radio front end circuitry 1692. The digital data may be passed to processing circuitry 1670. In other embodiments, the interface may comprise different components and/or different combinations of components.

In certain alternative embodiments, network node 1660 may not include separate radio front end circuitry 1692, instead, processing circuitry 1670 may comprise radio front end circuitry and may be connected to antenna 1662 without separate radio front end circuitry 1692. Similarly, in some embodiments, all or some of RF transceiver circuitry 1672 may be considered a part of interface 1690. In still other embodiments, interface 1690 may include one or more ports or terminals 1694, radio front end circuitry 1692, and RF transceiver circuitry 1672, as part of a radio unit (not shown), and interface 1690 may communicate with baseband processing circuitry 1674, which is part of a digital unit (not shown).

Antenna 1662 may include one or more antennas, or antenna arrays, configured to send and/or receive wireless signals 1665. Antenna 1662 may be coupled to radio front end circuitry 1690 and may be any type of antenna capable of transmitting and receiving data and/or signals wirelessly. In some embodiments, antenna 1662 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1662 may be separate from network node 1660 and may be connectable to network node 1660 through an interface or port.

Antenna 1662, interface 1690, and/or processing circuitry 1670 may be configured to perform any receiving operations and/or certain obtaining operations described herein as being performed by a network node. Any information, data and/or signals may be received from a wireless device, another network node and/or any other network equipment. Similarly, antenna 1662, interface 1690, and/or processing circuitry 1670 may be configured to perform any transmitting operations described herein as being performed by a network node. Any information, data and/or signals may be transmitted to a wireless device, another network node and/or any other network equipment.

Power circuitry 1687 may comprise, or be coupled to, power management circuitry and is configured to supply the components of network node 1660 with power for performing the functionality described herein. Power circuitry 1687 may receive power from power source 1686. Power source 1686 and/or power circuitry 1687 may be configured to provide power to the various components of network node 1660 in a form suitable for the respective components (e.g., at a voltage and current level needed for each respective component). Power source 1686 may either be included in, or external to, power circuitry 1687 and/or network node 1660. For example, network node 1660 may be connectable to an external power source (e.g., an electricity outlet) via an input circuitry or interface such as an electrical cable, whereby the external power source supplies power to power circuitry 1687. As a further example, power source 1686 may comprise a source of power in the form of a battery or battery pack which is connected to, or integrated in, power circuitry 1687. The battery may provide backup power should the external power source fail. Other types of power sources, such as photovoltaic devices, may also be used.

Alternative embodiments of network node 1660 may include additional components beyond those shown in FIG. 13 that may be responsible for providing certain aspects of the network node's functionality, including any of the functionality described herein and/or any functionality necessary to support the subject matter described herein. For example, network node 1660 may include user interface equipment to allow input of information into network node 1660 and to allow output of information from network node 1660. This may allow a user to perform diagnostic, maintenance, repair, and other administrative functions for network node 1660.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 1610 includes antenna 1611, interface 1614, processing circuitry 1620, device readable medium 1630, user interface equipment 1632, auxiliary equipment 1634, power source 1636 and power circuitry 1637. wireless device 1610 may include multiple sets of one or more of the illustrated components for different wireless technologies supported by wireless device 1610, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within wireless device 1610.

Antenna 1611 may include one or more antennas or antenna arrays, configured to send and/or receive wireless signals, and is connected to interface 1614. In certain alternative embodiments, antenna 1611 may be separate from wireless device 1610 and be connectable to wireless device 1610 through an interface or port. Antenna 1611, interface 1614, and/or processing circuitry 1620 may be configured to perform any receiving or transmitting operations described herein as being performed by a wireless device. Any information, data and/or signals may be received from a network node and/or another wireless device. In some embodiments, radio front end circuitry and/or antenna 1611 may be considered an interface.

As illustrated, interface 1614 comprises radio front end circuitry 1612 and antenna 1611. Radio front end circuitry 1612 comprise one or more filters 1618 and amplifiers 1616. Radio front end circuitry 1614 is connected to antenna 1611 and processing circuitry 1620, and is configured to condition signals communicated between antenna 1611 and processing circuitry 1620. Radio front end circuitry 1612 may be coupled to or a part of antenna 1611. In some embodiments, wireless device 1610 may not include separate radio front end circuitry 1612; rather, processing circuitry 1620 may comprise radio front end circuitry and may be connected to antenna 1611. Similarly, in some embodiments, some or all of RF transceiver circuitry 1622 may be considered a part of interface 1614. Radio front end circuitry 1612 may receive digital data that is to be sent out to other network nodes or wireless devices via a wireless connection. Radio front end circuitry 1612 may convert the digital data into a radio signal having the appropriate channel and bandwidth parameters using a combination of filters 1618 and/or amplifiers 1616. The radio signal may then be transmitted via antenna 1611. Similarly, when receiving data, antenna 1611 may collect radio signals which are then converted into digital data by radio front end circuitry 1612. The digital data may be passed to processing circuitry 1620. In other embodiments, the interface may comprise different components and/or different combinations of components.

Processing circuitry 1620 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 1610 components, such as device readable medium 1630, wireless device 1610 functionality. Such functionality may include providing any of the various wireless features or benefits discussed herein. For example, processing circuitry 1620 may execute instructions stored in device readable medium 1630 or in memory within processing circuitry 1620 to provide the functionality disclosed herein.

As illustrated, processing circuitry 1620 includes one or more of RF transceiver circuitry 1622, baseband processing circuitry 1624, and application processing circuitry 1626. In other embodiments, the processing circuitry may comprise different components and/or different combinations of components. In certain embodiments processing circuitry 1620 of wireless device 1610 may comprise a SOC. In some embodiments, RF transceiver circuitry 1622, baseband processing circuitry 1624, and application processing circuitry 1626 may be on separate chips or sets of chips. In alternative embodiments, part or all of baseband processing circuitry 1624 and application processing circuitry 1626 may be combined into one chip or set of chips, and RF transceiver circuitry 1622 may be on a separate chip or set of chips. In still alternative embodiments, part or all of RF transceiver circuitry 1622 and baseband processing circuitry 1624 may be on the same chip or set of chips, and application processing circuitry 1626 may be on a separate chip or set of chips. In yet other alternative embodiments, part or all of RF transceiver circuitry 1622, baseband processing circuitry 1624, and application processing circuitry 1626 may be combined in the same chip or set of chips. In some embodiments, RF transceiver circuitry 1622 may be a part of interface 1614. RF transceiver circuitry 1622 may condition RF signals for processing circuitry 1620.

In certain embodiments, some or all of the functionality described herein as being performed by a wireless device may be provided by processing circuitry 1620 executing instructions stored on device readable medium 1630, which in certain embodiments may be a computer-readable storage medium. In alternative embodiments, some or all of the functionality may be provided by processing circuitry 1620 without executing instructions stored on a separate or discrete device readable storage medium, such as in a hard-wired manner. In any of those particular embodiments, whether executing instructions stored on a device readable storage medium or not, processing circuitry 1620 can be configured to perform the described functionality. The benefits provided by such functionality are not limited to processing circuitry 1620 alone or to other components of wireless device 1610, but are enjoyed by wireless device 1610 as a whole, and/or by end users and the wireless network generally.

Processing circuitry 1620 may be configured to perform any determining, calculating, or similar operations (e.g., certain obtaining operations) described herein as being performed by a wireless device. These operations, as performed by processing circuitry 1620, may include processing information obtained by processing circuitry 1620 by, for example, converting the obtained information into other information, comparing the obtained information or converted information to information stored by wireless device 1610, and/or performing one or more operations based on the obtained information or converted information, and as a result of said processing making a determination.

Device readable medium 1630 may be operable to store a computer program, software, an application including one or more of logic, rules, code, tables, etc. and/or other instructions capable of being executed by processing circuitry 1620. Device readable medium 1630 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1620. In some embodiments, processing circuitry 1620 and device readable medium 1630 may be considered to be integrated.

User interface equipment 1632 may provide components that allow for a human user to interact with wireless device 1610. Such interaction may be of many forms, such as visual, audial, tactile, etc. User interface equipment 1632 may be operable to produce output to the user and to allow the user to provide input to wireless device 1610. The type of interaction may vary depending on the type of user interface equipment 1632 installed in wireless device 1610. For example, if wireless device 1610 is a smart phone, the interaction may be via a touch screen; if wireless device 1610 is a smart meter, the interaction may be through a screen that provides usage (e.g., the number of gallons used) or a speaker that provides an audible alert (e.g., if smoke is detected). User interface equipment 1632 may include input interfaces, devices and circuits, and output interfaces, devices and circuits. User interface equipment 1632 is configured to allow input of information into wireless device 1610, and is connected to processing circuitry 1620 to allow processing circuitry 1620 to process the input information. User interface equipment 1632 may include, for example, a microphone, a proximity or other sensor, keys/buttons, a touch display, one or more cameras, a USB port, or other input circuitry. User interface equipment 1632 is also configured to allow output of information from wireless device 1610, and to allow processing circuitry 1620 to output information from wireless device 1610. User interface equipment 1632 may include, for example, a speaker, a display, vibrating circuitry, a USB port, a headphone interface, or other output circuitry. Using one or more input and output interfaces, devices, and circuits, of user interface equipment 1632, wireless device 1610 may communicate with end users and/or the wireless network, and allow them to benefit from the functionality described herein.

Auxiliary equipment 1634 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 1634 may vary depending on the embodiment and/or scenario.

Power source 1636 may, in some embodiments, be in the form of a battery or battery pack. Other types of power sources, such as an external power source (e.g., an electricity outlet), photovoltaic devices or power cells, may also be used. wireless device 1610 may further comprise power circuitry 1637 for delivering power from power source 1636 to the various parts of wireless device 1610 which need power from power source 1636 to carry out any functionality described or indicated herein. Power circuitry 1637 may in certain embodiments comprise power management circuitry. Power circuitry 1637 may additionally or alternatively be operable to receive power from an external power source; in which case wireless device 1610 may be connectable to the external power source (such as an electricity Power circuitry 1637 may also in certain embodiments be operable to deliver power from an external power source to power source 1636. This may be, for example, for the charging of power source 1636. Power circuitry 1637 may perform any formatting, converting, or other modification to the power from power source 1636 to make the power suitable for the respective components of wireless device 1610 to which power is supplied.

Figure 14:
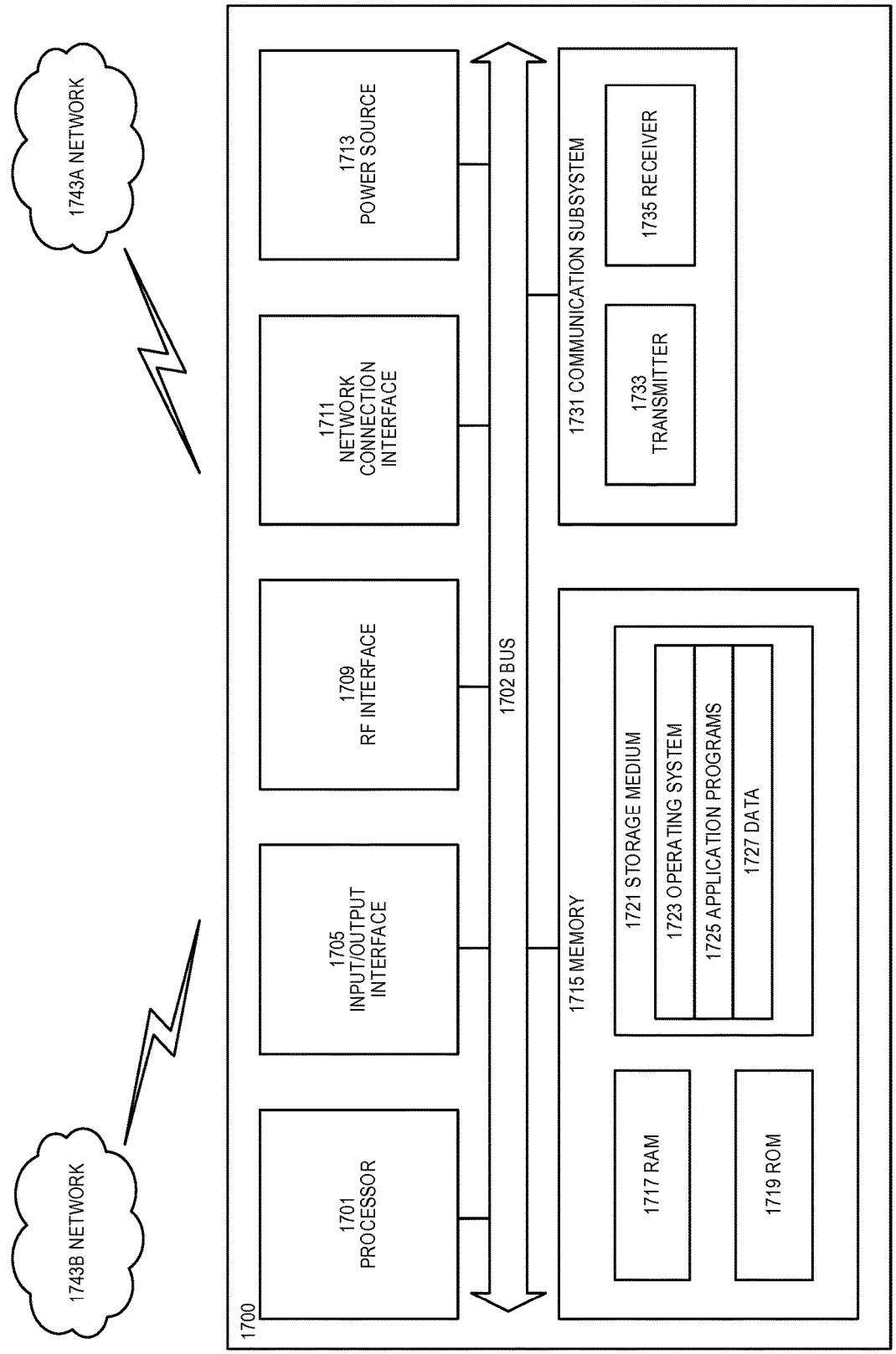
FIG. 14 shows an exemplary UE applicable to the solution presented herein.

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1720 may be any UE identified by the $3^{rd}$ Generation Partnership Project (3GPP), including a NB-IoT UE, a machine type communication (MTC) UE, and/or an enhanced MTC (eMTC) UE. UE 1700, as illustrated in FIG. 14, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeably. Accordingly, although FIG. 14 is a UE, the components discussed herein are equally applicable to a wireless device, and vice-versa.

In FIG. 14, UE 1700 includes processing circuitry 1701 that is operatively coupled to input/output interface 1705, radio frequency (RF) interface 1709, network connection interface 1711, memory 1715 including random access memory (RAM) 1717, read-only memory (ROM) 1719, and storage medium 1721 or the like, communication subsystem 1731, power source 1733, and/or any other component, or any combination thereof. Storage medium 1721 includes operating system 1723, application program 1725, and data 1727. In other embodiments, storage medium 1721 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 1701 may be configured to process computer instructions and data. Processing circuitry 1701 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1701 may include two central processing units (CPUs). Data may be information in a form suitable for use by a computer.

In the depicted embodiment, input/output interface 1705 may be configured to provide a communication interface to an input device, output device, or input and output device. UE 1700 may be configured to use an output device via input/output interface 1705. An output device may use the same type of interface port as an input device. For example, a USB port may be used to provide input to and output from UE 1700. The output device may be a speaker, a sound card, a video card, a display, a monitor, a printer, an actuator, an emitter, a smartcard, another output device, or any combination thereof. UE 1700 may be configured to use an input device via input/output interface 1705 to allow a user to capture information into UE 1700. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 1709 may be configured to provide a communication interface to RF components such as a transmitter, a receiver, and an antenna. Network connection interface 1711 may be configured to provide a communication interface to network 1743a. Network 1743a may encompass wired and/or wireless networks such as a local-area network (LAN), a wide-area network (WAN), a computer network, a wireless network, a telecommunications network, another like network or any combination thereof. For example, network 1743a may comprise a Wi-Fi network. Network connection interface 1711 may be configured to include a receiver and a transmitter interface used to communicate with one or more other devices over a communication network according to one or more communication protocols, such as Ethernet, TCP/IP, SONET, ATM, or the like. Network connection interface 1711 may implement receiver and transmitter functionality appropriate to the communication network links (e.g., optical, electrical, and the like). The transmitter and receiver functions may share circuit components, software or firmware, or alternatively may be implemented separately.

RAM 1717 may be configured to interface via bus 1702 to processing circuitry 1701 to provide storage or caching of data or computer instructions during the execution of software programs such as the operating system, application programs, and device drivers. ROM 1719 may be configured to provide computer instructions or data to processing circuitry 1701. For example, ROM 1719 may be configured to store invariant low-level system code or data for basic system functions such as basic input and output (I/O), startup, or reception of keystrokes from a keyboard that are stored in a non-volatile memory. Storage medium 1721 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1721 may be configured to include operating system 1723, application program 1725 such as a web browser application, a widget or gadget engine or another application, and data file 1727. Storage medium 1721 may store, for use by UE 1700, any of a variety of various operating systems or combinations of operating systems.

Storage medium 1721 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1721 may allow UE 1700 to access computer-executable instructions, application programs or the like, stored on transitory or non-transitory memory media, to off-load data, or to upload data. An article of manufacture, such as one utilizing a communication system may be tangibly embodied in storage medium 1721, which may comprise a device readable medium.

In FIG. 14, processing circuitry 1701 may be configured to communicate with network 1743b using communication subsystem 1731. Network 1743a and network 1743b may be the same network or networks or different network or networks. Communication subsystem 1731 may be configured to include one or more transceivers used to communicate with network 1743b. For example, communication subsystem 1731 may be configured to include one or more transceivers used to communicate with one or more remote transceivers of another device capable of wireless communication such as another wireless device, UE, or base station of a radio access network (RAN) according to one or more communication protocols, such as IEEE 802.12, CDMA, WCDMA, GSM, LTE, UTRAN, WiMax, or the like. Each transceiver may include transmitter 1733 and/or receiver 1735 to implement transmitter or receiver functionality, respectively, appropriate to the RAN links (e.g., frequency allocations and the like). Further, transmitter 1733 and receiver 1735 of each transceiver may share circuit components, software or firmware, or alternatively may be implemented separately.

In the illustrated embodiment, the communication functions of communication subsystem 1731 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1731 may include cellular communication, Wi-Fi communication, Bluetooth communication, and GPS communication. Network 1743b may encompass wired and/or wireless networks such as a local-area network (LAN), a wide-area network (WAN), a computer network, a wireless network, a telecommunications network, another like network or any combination thereof. For example, network 1743b may be a cellular network, a Wi-Fi network, and/or a near-field network. Power source 1713 may be configured to provide alternating current (AC) or direct current (DC) power to components of UE 1700.

The features, benefits and/or functions described herein may be implemented in one of the components of UE 1700 or partitioned across multiple components of UE 1700. Further, the features, benefits, and/or functions described herein may be implemented in any combination of hardware, software or firmware. In one example, communication subsystem 1731 may be configured to include any of the components described herein. Further, processing circuitry 1701 may be configured to communicate with any of such components over bus 1702. In another example, any of such components may be represented by program instructions stored in memory that when executed by processing circuitry 1701 perform the corresponding functions described herein. In another example, the functionality of any of such components may be partitioned between processing circuitry 1701 and communication subsystem 1731. In another example, the non-computationally intensive functions of any of such components may be implemented in software or firmware and the computationally intensive functions may be implemented in hardware.

Figure 15:
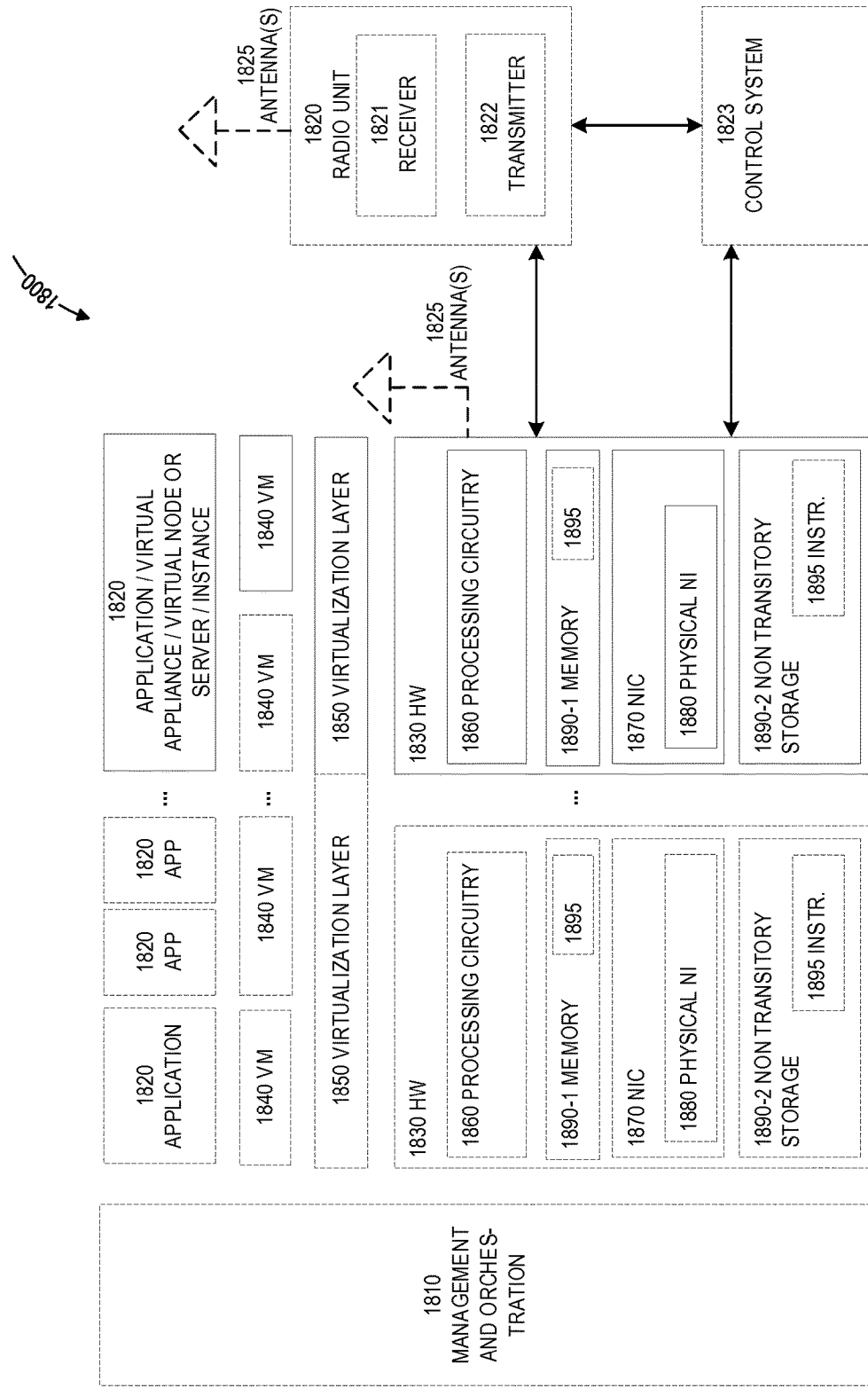
FIG. 15 shows an exemplary virtualization environment applicable to the solution presented herein.

FIG. 15 is a schematic block diagram illustrating a virtualization environment 1800 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1800 hosted by one or more of hardware nodes 1830. Further, in embodiments in which the virtual node is not a radio access node or does not require radio connectivity (e.g., a core network node), then the network node may be entirely virtualized.

The functions may be implemented by one or more applications 1820 (which may alternatively be called software instances, virtual appliances, network functions, virtual nodes, virtual network functions, etc.) operative to implement some of the features, functions, and/or benefits of some of the embodiments disclosed herein. Applications 1820 are run in virtualization environment 1800 which provides hardware 1830 comprising processing circuitry 1860 and memory 1890. Memory 1890 contains instructions 1895 executable by processing circuitry 1860 whereby application 1820 is operative to provide one or more of the features, benefits, and/or functions disclosed herein.

Virtualization environment 1800, comprises general-purpose or special-purpose network hardware devices 1830 comprising a set of one or more processors or processing circuitry 1860, which may be commercial off-the-shelf (COTS) processors, dedicated Application Specific Integrated Circuits (ASICs), or any other type of processing circuitry including digital or analog hardware components or special purpose processors. Each hardware device may comprise memory 1890-1 which may be non-persistent memory for temporarily storing instructions 1895 or software executed by processing circuitry 1860. Each hardware device may comprise one or more network interface controllers (NICs) 1870, also known as network interface cards, which include physical network interface 1880. Each hardware device may also include non-transitory, persistent, machine-readable storage media 1890-2 having stored therein software 1895 and/or instructions executable by processing circuitry 1860. Software 1895 may include any type of software including software for instantiating one or more virtualization layers 1850 (also referred to as hypervisors), software to execute virtual machines 1840 as well as software allowing it to execute functions, features and/or benefits described in relation with some embodiments described herein.

Virtual machines 1840, comprise virtual processing, virtual memory, virtual networking or interface and virtual storage, and may be run by a corresponding virtualization layer 1850 or hypervisor. Different embodiments of the instance of virtual appliance 1820 may be implemented on one or more of virtual machines 1840, and the implementations may be made in different ways.

During operation, processing circuitry 1860 executes software 1895 to instantiate the hypervisor or virtualization layer 1850, which may sometimes be referred to as a virtual machine monitor (VMM). Virtualization layer 1850 may present a virtual operating platform that appears like networking hardware to virtual machine 1840.

As shown in FIG. 15, hardware 1830 may be a standalone network node with generic or specific components. Hardware 1830 may comprise antenna 18225 and may implement some functions via virtualization. Alternatively, hardware 1830 may be part of a larger cluster of hardware (e.g. such as in a data center or customer premise equipment (CPE)) where many hardware nodes work together and are managed via management and orchestration (MANO) 1810, which, among others, oversees lifecycle management of applications 1820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1840 may be a software implementation of a physical machine that runs programs as if they were executing on a physical, non-virtualized machine. Each of virtual machines 1840, and that part of hardware 1830 that executes that virtual machine, be it hardware dedicated to that virtual machine and/or hardware shared by that virtual machine with others of the virtual machines 1840, forms a separate virtual network elements (VNE).

Still in the context of NFV, Virtual Network Function (VNF) is responsible for handling specific network functions that run in one or more virtual machines 1840 on top of hardware networking infrastructure 1830 and corresponds to application 1820 in FIG. 15.

In some embodiments, one or more radio units 1820 that each include one or more transmitters 1822 and one or more receivers 1821 may be coupled to one or more antennas 1825. Radio units 1820 may communicate directly with hardware nodes 1830 via one or more appropriate network interfaces and may be used in combination with the virtual components to provide a virtual node with radio capabilities, such as a radio access node or a base station.

In some embodiments, some signalling can be effected with the use of control system 1823 which may alternatively be used for communication between the hardware nodes 1830 and radio units 1820.

Figure 16:
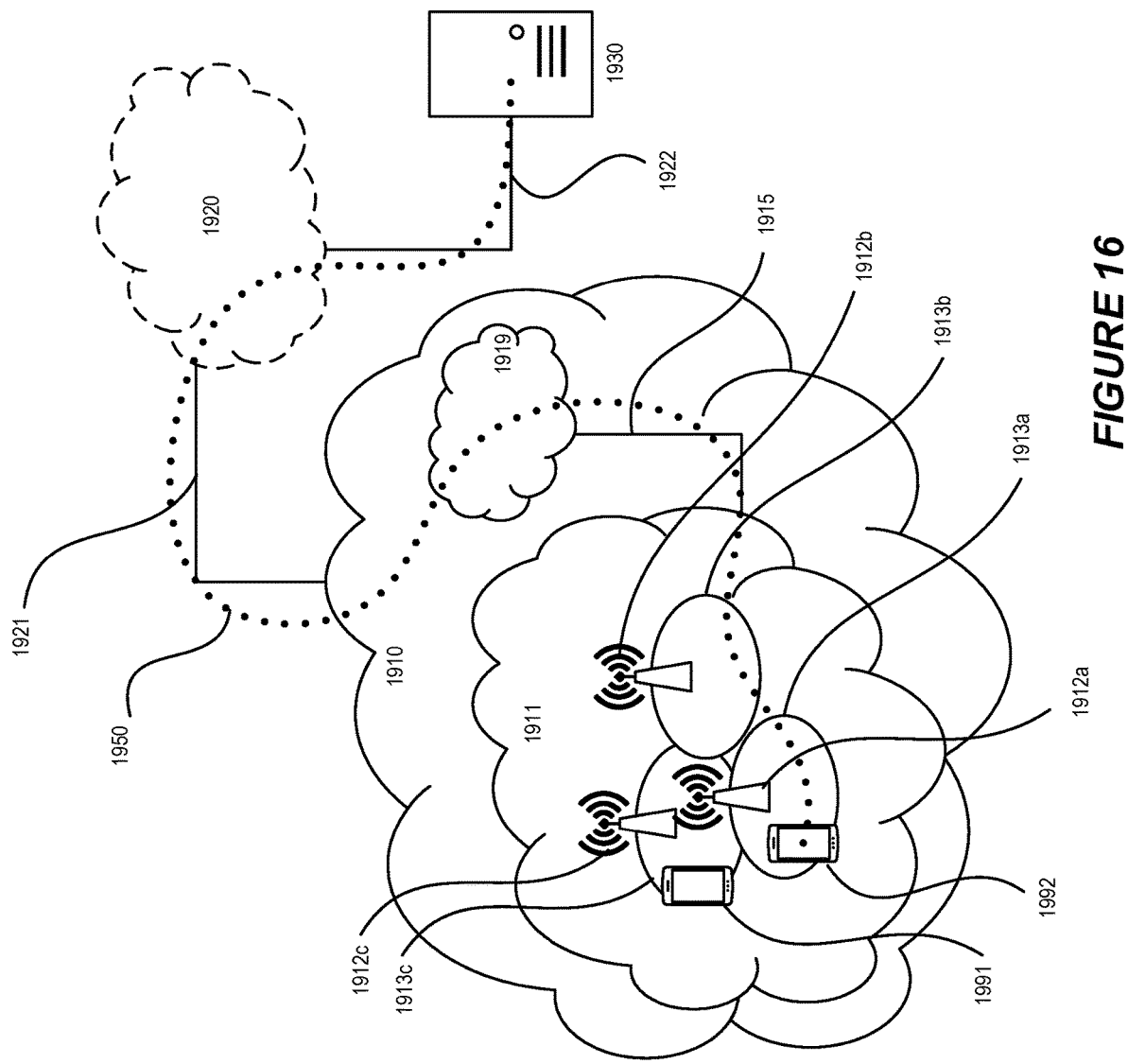
FIG. 16 shows an exemplary telecommunications network applicable to the solution presented herein.

FIG. 16 illustrates a telecommunication network connected via an intermediate network to a host computer in accordance with some embodiments. In particular, with reference to FIG. 16, in accordance with an embodiment, a communication system includes telecommunication network 1910, such as a 3GPP-type cellular network, which comprises access network 1911, such as a radio access network, and core network 1914. Access network 1911 comprises a plurality of base stations 1912a, 1912b, 1912c, such as NBs, eNBs, gNBs or other types of wireless access points, each defining a corresponding coverage area 1913a, 1913b, 1913c. Each base station 1912a, 1912b, 1912c is connectable to core network 1914 over a wired or wireless connection 1915. A first UE 1991 located in coverage area 1913c is configured to wirelessly connect to, or be paged by, the corresponding base station 1912c. A second UE 1992 in coverage area 1913a is wirelessly connectable to the corresponding base station 1912a. While a plurality of UEs 1991, 1992 are illustrated in this example, the disclosed embodiments are equally applicable to a situation where a sole UE is in the coverage area or where a sole UE is connecting to the corresponding base station 1912.

Telecommunication network 1910 is itself connected to host computer 1930, which may be embodied in the hardware and/or software of a standalone server, a cloud-implemented server, a distributed server, or as processing resources in a server farm. Host computer 1930 may be under the ownership or control of a service provider, or may be operated by the service provider or on behalf of the service provider. Connections 1921 and 1922 between telecommunication network 1910 and host computer 1930 may extend directly from core network 1914 to host computer 1930 or may go via an optional intermediate network 1920. Intermediate network 1920 may be one of, or a combination of more than one of, a public, private or hosted network; intermediate network 1920, if any, may be a backbone network or the Internet; in particular, intermediate network 1920 may comprise two or more sub-networks (not shown).

The communication system of FIG. 16 as a whole enables connectivity between the connected UEs 1991, 1992 and host computer 1930. The connectivity may be described as an over-the-top (OTT) connection 1950. Host computer 1930 and the connected UEs 1991, 1992 are configured to communicate data and/or signaling via OTT connection 1950, using access network 1911, core network 1914, any intermediate network 1920 and possible further infrastructure (not shown) as intermediaries. OTT connection 1950 may be transparent in the sense that the participating communication devices through which OTT connection 1950 passes are unaware of routing of uplink and downlink communications. For example, base station 1912 may not or need not be informed about the past routing of an incoming downlink communication with data originating from host computer 1930 to be forwarded (e.g., handed over) to a connected UE 1991. Similarly, base station 1912 need not be aware of the future routing of an outgoing uplink communication originating from the UE 1991 towards the host computer 1930.

Figure 17:
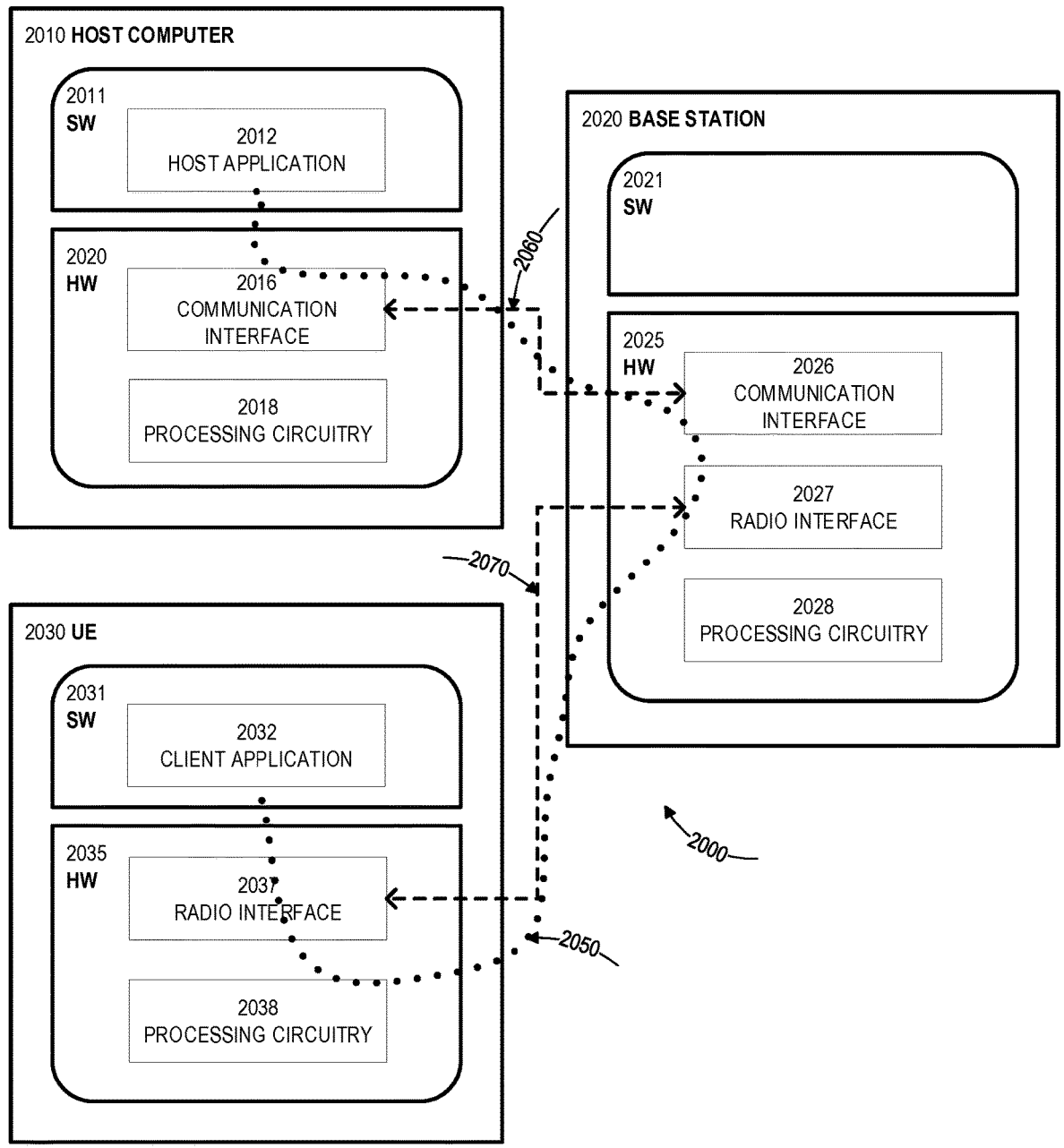
FIG. 17 shows an exemplary system comprising a host computer applicable to the solution presented herein.

Example implementations, in accordance with an embodiment, of the UE, base station and host computer discussed in the preceding paragraphs will now be described with reference to FIG. 17. FIG. 17 illustrates host computer communicating via a base station with a user equipment over a partially wireless connection in accordance with some embodiments In communication system 2000, host computer 2010 comprises hardware 2015 including communication interface 2016 configured to set up and maintain a wired or wireless connection with an interface of a different communication device of communication system 2000. Host computer 2010 further comprises processing circuitry 2018, which may have storage and/or processing capabilities. In particular, processing circuitry 2018 may comprise one or more programmable processors, application-specific integrated circuits, field programmable gate arrays or combinations of these (not shown) adapted to execute instructions. Host computer 2010 further comprises software 2011, which is stored in or accessible by host computer 2010 and executable by processing circuitry 2018. Software 2011 includes host application 2012. Host application 2012 may be operable to provide a service to a remote user, such as UE 2030 connecting via OTT connection 2050 terminating at UE 2030 and host computer 2010. In providing the service to the remote user, host application 2012 may provide user data which is transmitted using OTT connection 2050.

Communication system 2000 further includes base station 2020 provided in a telecommunication system and comprising hardware 2025 enabling it to communicate with host computer 2010 and with UE 2030. Hardware 2025 may include communication interface 2026 for setting up and maintaining a wired or wireless connection with an interface of a different communication device of communication system 2000, as well as radio interface 2027 for setting up and maintaining at least wireless connection 2070 with UE 2030 located in a coverage area (not shown in FIG. 17) served by base station 2020. Communication interface 2026 may be configured to facilitate connection 2060 to host computer 2010. Connection 2060 may be direct or it may pass through a core network (not shown in FIG. 17) of the telecommunication system and/or through one or more intermediate networks outside the telecommunication system. In the embodiment shown, hardware 2025 of base station 2020 further includes processing circuitry 2028, which may comprise one or more programmable processors, application-specific integrated circuits, field programmable gate arrays or combinations of these (not shown) adapted to execute instructions. Base station 2020 further has software 2021 stored internally or accessible via an external connection.

Communication system 2000 further includes UE 2030 already referred to. Its hardware 2035 may include radio interface 2037 configured to set up and maintain wireless connection 2070 with a base station serving a coverage area in which UE 2030 is currently located. Hardware 2035 of UE 2030 further includes processing circuitry 2038, which may comprise one or more programmable processors, application-specific integrated circuits, field programmable gate arrays or combinations of these (not shown) adapted to execute instructions. UE 2030 further comprises software 2031, which is stored in or accessible by UE 2030 and executable by processing circuitry 2038. Software 2031 includes client application 2032. Client application 2032 may be operable to provide a service to a human or non-human user via UE 2030, with the support of host computer 2010. In host computer 2010, an executing host application 2012 may communicate with the executing client application 2032 via OTT connection 2050 terminating at UE 2030 and host computer 2010. In providing the service to the user, client application 2032 may receive request data from host application 2012 and provide user data in response to the request data. OTT connection 2050 may transfer both the request data and the user data. Client application 2032 may interact with the user to generate the user data that it provides.

It is noted that host computer 2010, base station 2020 and UE 2030 illustrated in FIG. 17 may be similar or identical to host computer 2030, one of base stations 2012a, 2012b, 2012c and one of UEs 2091, 2092 of FIG. 17, respectively. This is to say, the inner workings of these entities may be as shown in FIG. 17 and independently, the surrounding network topology may be that of FIG. 1176.

In FIG. 17, OTT connection 2050 has been drawn abstractly to illustrate the communication between host computer 2010 and UE 2030 via base station 2020, without explicit reference to any intermediary devices and the precise routing of messages via these devices. Network infrastructure may determine the routing, which it may be configured to hide from UE 2030 or from the service provider operating host computer 2010, or both. While OTT connection 2050 is active, the network infrastructure may further take decisions by which it dynamically changes the routing (e.g., on the basis of load balancing consideration or reconfiguration of the network).

Wireless connection 2070 between UE 2030 and base station 2020 is in accordance with the teachings of the embodiments described herein. One or more of the various embodiments improve the performance of OTT services provided to UE 2030 using OTT connection 2050, in which wireless connection 2070 forms the last segment.

A measurement procedure may be provided for the purpose of monitoring data rate, latency and other factors on which the one or more embodiments improve. There may further be an optional network functionality for reconfiguring OTT connection 2050 between host computer 2010 and UE 2030, in response to variations in the measurement results. The measurement procedure and/or the network functionality for reconfiguring OTT connection 2050 may be implemented in software 2011 and hardware 2015 of host computer 2010 or in software 2031 and hardware 2035 of UE 2030, or both. In embodiments, sensors (not shown) may be deployed in or in association with communication devices through which OTT connection 2050 passes; the sensors may participate in the measurement procedure by supplying values of the monitored quantities exemplified above, or supplying values of other physical quantities from which software 2011, 2031 may compute or estimate the monitored quantities. The reconfiguring of OTT connection 2050 may include message format, retransmission settings, preferred routing etc.; the reconfiguring need not affect base station 2020, and it may be unknown or imperceptible to base station 2020. Such procedures and functionalities may be known and practiced in the art. In certain embodiments, measurements may involve proprietary UE signaling facilitating host computer 2010's measurements of throughput, propagation times, latency and the like. The measurements may be implemented in that software 2011 and 2031 causes messages to be transmitted, in particular empty or 'dummy' messages, using OTT connection 2050 while it monitors propagation times, errors etc.

Figure 18:
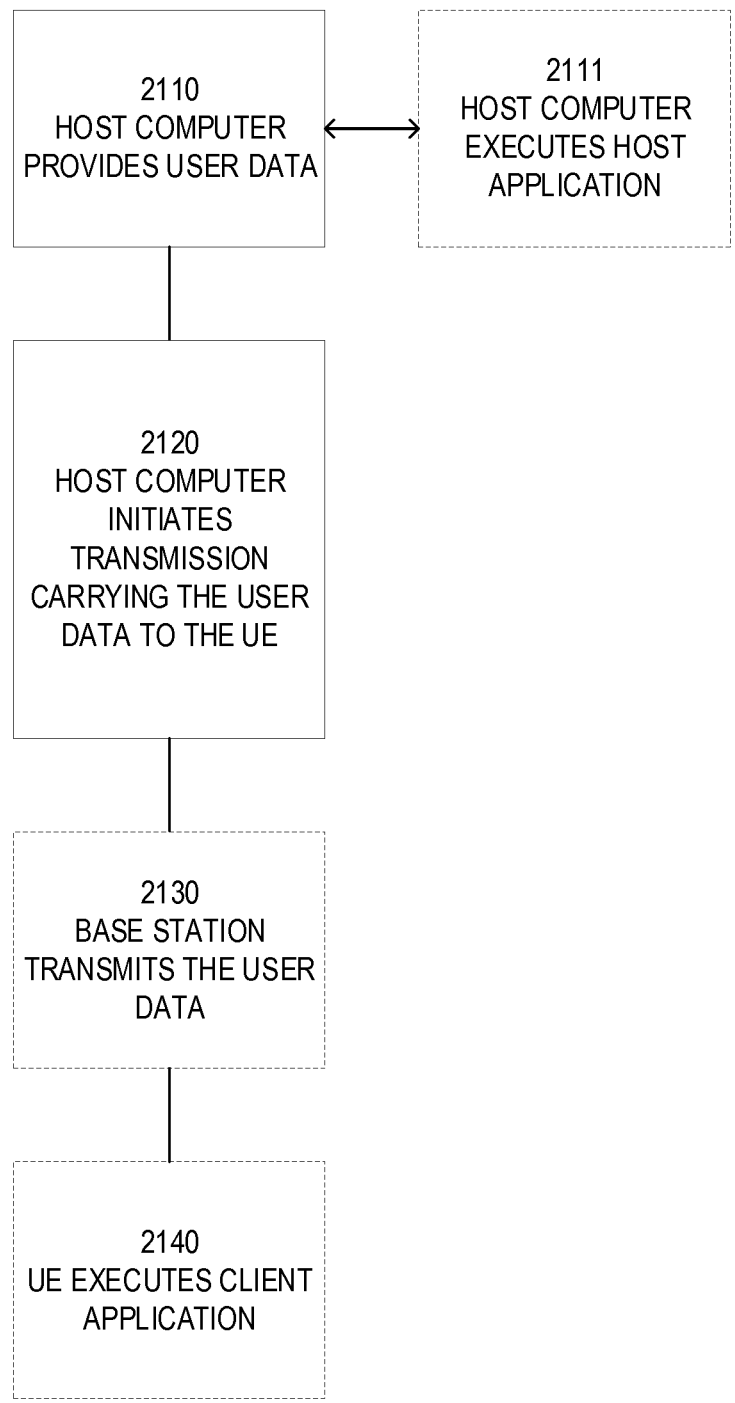
FIG. 18 shows an exemplary method implemented in a communication system in accordance with embodiments of the solution presented herein.

FIG. 18 is a flowchart illustrating a method implemented in a communication system, in accordance with one embodiment. The communication system includes a host computer, a base station and a UE which may be those described with reference to FIGS. 16 and 17. For simplicity of the solution presented herein, only drawing references to FIG. 18 will be included in this section. In step 2110, the host computer provides user data. In substep 2111 (which may be optional) of step 2110, the host computer provides the user data by executing a host application. In step 2120, the host computer initiates a transmission carrying the user data to the UE. In step 2130 (which may be optional), the base station transmits to the UE the user data which was carried in the transmission that the host computer initiated, in accordance with the teachings of the embodiments described herein. In step 2140 (which may also be optional), the UE executes a client application associated with the host application executed by the host computer.

Figure 19:
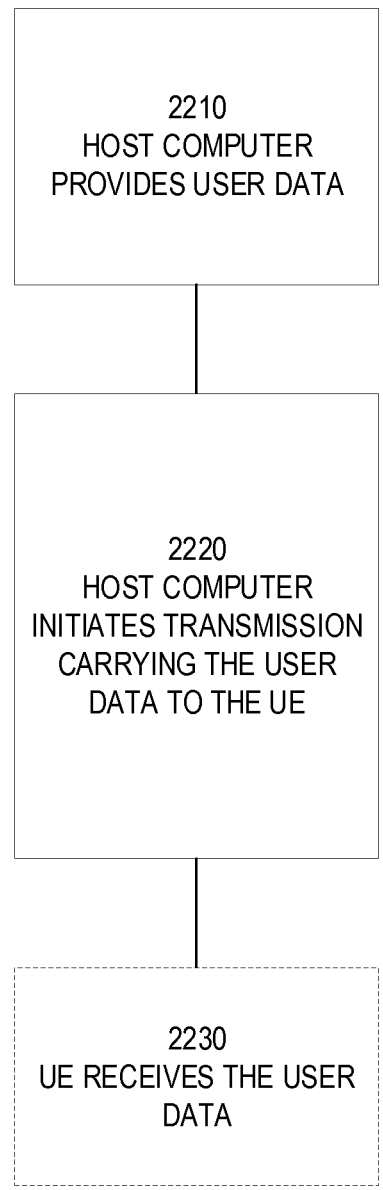
FIG. 19 shows another exemplary method implemented in a communication system in accordance with embodiments of the solution presented herein.

FIG. 19 is a flowchart illustrating a method implemented in a communication system, in accordance with one embodiment. The communication system includes a host computer, a base station and a UE which may be those described with reference to FIGS. 16 and 17. For simplicity of the solution presented herein, only drawing references to FIG. 19 will be included in this section. In step 2210 of the method, the host computer provides user data. In an optional substep (not shown) the host computer provides the user data by executing a host application. In step 2220, the host computer initiates a transmission carrying the user data to the UE. The transmission may pass via the base station, in accordance with the teachings of the embodiments described herein. In step 2230 (which may be optional), the UE receives the user data carried in the transmission.

Figure 20:
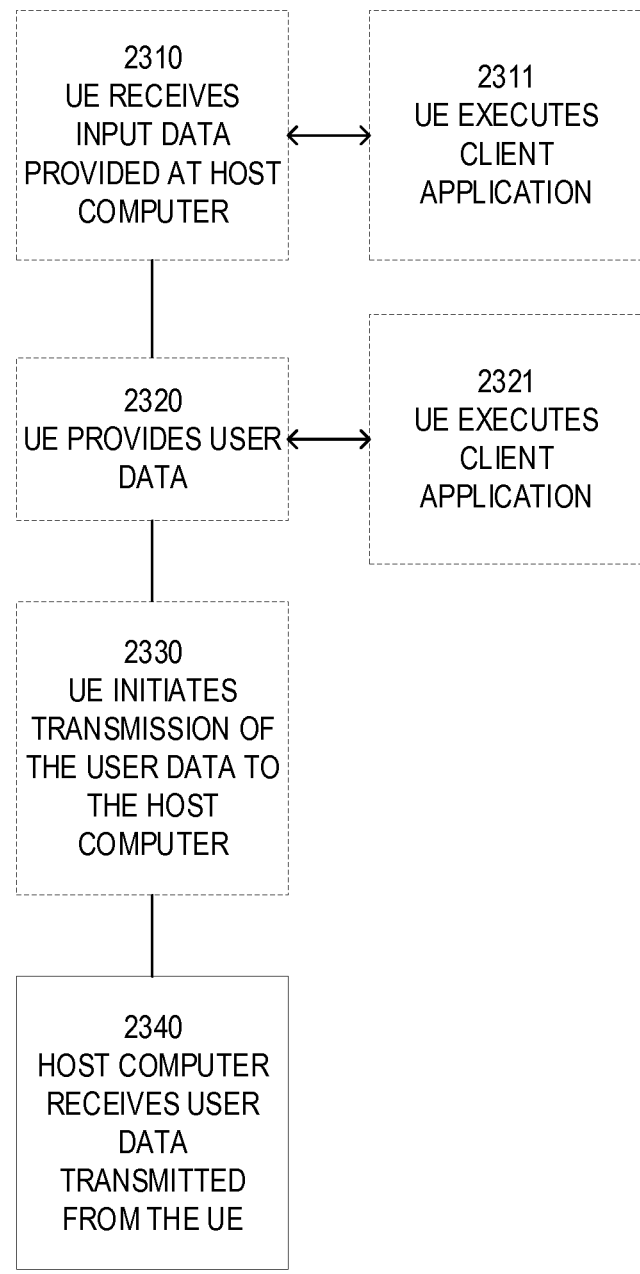
FIG. 20 shows another exemplary method implemented in a communication system in accordance with embodiments of the solution presented herein.

FIG. 20 is a flowchart illustrating a method implemented in a communication system, in accordance with one embodiment. The communication system includes a host computer, a base station and a UE which may be those described with reference to FIGS. 16 and 17. For simplicity of the solution presented herein, only drawing references to FIG. 20 will be included in this section. In step 2310 (which may be optional), the UE receives input data provided by the host computer. Additionally or alternatively, in step 2320, the UE provides user data. In substep 2321 (which may be optional) of step 2320, the UE provides the user data by executing a client application. In substep 2311 (which may be optional) of step 2310, the UE executes a client application which provides the user data in reaction to the received input data provided by the host computer. In providing the user data, the executed client application may further consider user input received from the user. Regardless of the specific manner in which the user data was provided, the UE initiates, in substep 2330 (which may be optional), transmission of the user data to the host computer. In step 2340 of the method, the host computer receives the user data transmitted from the UE, in accordance with the teachings of the embodiments described herein.

Figure 21:
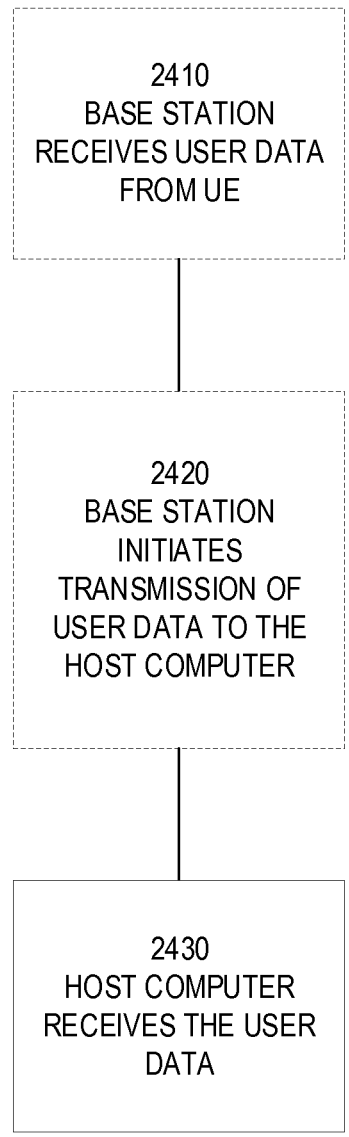
FIG. 21 shows another exemplary method implemented in a communication system in accordance with embodiments of the solution presented herein.

FIG. 21 is a flowchart illustrating a method implemented in a communication system, in accordance with one embodiment. The communication system includes a host computer, a base station and a UE which may be those described with reference to FIGS. 16 and 17. For simplicity of the solution presented herein, only drawing references to FIG. 21 will be included in this section. In step 2410 (which may be optional), in accordance with the teachings of the embodiments described herein, the base station receives user data from the UE. In step 2420 (which may be optional), the base station initiates transmission of the received user data to the host computer. In step 2430 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. Additional information may also be found in the RAN1 contribution: R1-180xxxx "On CSI-IM and PDSCH Rate Matching Using ZP CSI-RS," Agenda Item 7.2.2.1, during the 3GPP TSG RAN WG1 meeting AH 1801 in Vancouver Canada, 22-26 Jan. 2018, which is incorporated by reference herein in its entirety. The following details important elements from this RAN1 contribution.

As has already been agreed, configuration of CSI-IM, indicating REs for interference measurements, and ZP CSI-RS, indicating rate matching of PDSCH, is separate. The motivation for why CSI-IM is not always rate matched around is that for CoMP CQI calculations, for instance with DPS hypothesis, the UE may want to measure its own PDSCH as interference. Therefore, in some cases, the CSI-IM would not have a corresponding ZP CSI-RS configured to indicate PDSCH rate matching on the CSI-IM REs. In most practical implementations though (not involving CoMP) it is beneficial to always configure overlapping CSI-IM and ZP CSI-RS resources so that the UE would not measure its own PDSCH as interference.

According to a first Observation, a separate CSI-IM and ZP CSI-RS configuration is useful for CoMP, but in most cases a CSI-IM resource would always have an overlapping ZP CSI-RS resource. When aperiodic CSI-IM is used, the presence of aperiodic CSI-IM (and CSI-RS) is indicated by the CSI request field in the UL-related DCI. If the UE is also scheduled with a PDSCH in the same slot wherein the aperiodic CSI-IM occurs, rate matching around the aperiodic CSI-IM would have to be indicated using the ZP CSI-RS field in the DL DCI (note that the UE is aware of the presence of the aperiodic CSI-RS from the UL DCI and so knows that PDSCH should be rate matched around it without the need for aperiodic ZP CSI-RS indication.

This means that if a first UE receives PDSCH and measures aperiodic CSI-IM in the same slot, the gNB cannot trigger aperiodic NZP CSI-RS/CSI-IM measurements for a second UE in the same slot, as that would require the first UE to rate match its PDSCH around the second UEs NZP CSI-RS/CSI-IM. This rate matching is not possible to indicate since the ZP CSI-RS trigger field is already used to indicate rate matching around the first UEs CSI-IM. Furthermore, the codepoints of the ZP CSI-RS trigger field are exhausted as all possible CSI-IM positions must be possible to trigger, which limits the amount of possible NZP CSI-RS positions that PDSCH can be rate matched around.

Per a second Observation, and according to current status of the spec, aperiodic ZP CSI-RS would need to be indicated with ZP CSI-RS field in DL DCI to rate match around aperiodic CSI-IM. This implies that only a single UE can receive beamformed NZP CSI-RS in a slot, since the ZP CSI-RS field cannot be used to indicate rate matching around other UEs NZP CSI-RS. This limits the scheduling flexibility and also the utility of the aperiodic CSI-RS/CSI-IM feature. It would be more efficient if rate matching around aperiodic CSI-IM resources could also be indicated by the CSI request field in UL DCI, as this would allow the ZP CSI-RS trigger field to indicate rate matching around aperiodic NZP CSI-RS of other UEs, as is its intention.

According to one proposal: whether aperiodic CSI-IM REs are rate matched around or not is conveyed by the CSI request field. The following options can be considered:
   a. A CSI-IM-Resource in RRC is optionally associated with a ZP-CSI-RS-Resource
   b. A CSI-IM-Resource in RRC has a true/false state that indicates if it's rate matched around
   c. The CSI request field can optionally trigger a ZP CSI-RS resource set The following provides an illustration of why joint indication of aperiodic CSI-IM and rate matching is beneficial. This illustration refers to FIG. 6, which gives an example of why joint indication of aperiodic CSI-IM and rate matching is beneficial. In slot n, UE #1 has been scheduled with a PDSCH by a DL DCI (which was received either in slot n or a previous slot). UE #1 is also triggered with an aperiodic CSI report and measurement on aperiodic CSI-RS and CSI-IM, occurring in slot n, using an UL DCI. The UL DCI also schedules the UE for PUSCH transmission in slot n+3, whereon the aperiodic CSI report is carried. Also in slot n, UE #2 is triggered with an aperiodic CSI report and measurement on another aperiodic CSI-RS and CSI-IM, also occurring in slot n, by another UL DCI. That UL DCI also schedules a PUSCH transmission for UE #2 whereon the CSI report shall be carried.

Upon reception of the UL DCI scheduling PUSCH for UE #1, it determines from the CSI request field that aperiodic NZP CSI-RS and CSI-IM is triggered in slot n, and therefore knows that the PDSCH scheduled by the DL DCI shall be rate matched around the NZP CSI-RS REs. If rate matching of CSI-IM can be inferred from the CSI request field, the UE can infer that the PDSCH shall be rate matched around the aperiodic CSI-IM as well. Otherwise, the ZP CSI-RS field in DL DCI must be used to indicate rate matching around CSI-IM.

Since UE #1 is not aware of the aperiodically triggered CSI-IM and CSI-RS for UE #2, it must be explicitly indicated that its PDSCH shall be rate matched around the REs that UE #2's CSI-RS and CSI-IM occupy. This can be indicated in the ZP CSI-RS trigger in the DL DCI that schedules UE #1's PDSCH, if it does not have to be used to indicate rate matching around the UE #1s own CSI-IM. However, if that is not the case, it is not possible to trigger an aperiodic CSI-RS/CSI-IM for UE #2, since it would not be possible to indicate the appropriate rate matching of PDSCH to UE #1.

Note that as UE #2 is not scheduled to receive a PDSCH in slot n, it does not need to be informed about the presence of CSI-RS #1 and CSI-IM #1, and no ZP CSI-RS indication for UE #2 is needed.

The following provides an introduction of semi-persistent ZP CSI-RS resources. In this case, another issue is that NR supports semi-persistent CSI-RS which may be used for UE-specific beamforming, while semi-persistent ZP CSI-RS is not yet supported for rate matching. Hence, it seems natural to also support semi-persistent ZP CSI-RS for rate matching to indicate whether or not PDSCH should be rate matched. Otherwise, all UEs in the cell would have to either measure on all active SP NZP CSI-RS resources, or, the gNB must indicate rate matching around SP NZP CSI-RS resources using the ZP CSI-RS trigger field in DCI, which seems inefficient.

According to another proposal: for the purpose of indicating rate matching around semi-persistent NZP CSI-RS of other UEs or cells, NR supports semi-persistent ZP CSI-RS.

Since semi-persistent CSI-RS, CSI-IM and CSI reporting on PUCCH is activated with a MAC CE message, semi-persistent ZP CSI-RS could also be activated using MAC CE. As a SP ZP CSI-RS activation for the purpose of rate matching around other UEs SP NZP CSI-RS would likely be configured independently, a separate MAC CE message could be used, for instance containing a bitmap where each bit indicates activation/deactivation of an RRC configured ZP-CSI-RS-ResourceSet or simply conveying an ZP-CSI-RS-ResourceSetId.

According to another proposal: Semi-persistent ZP CSI-RS is activated/deactivate via MAC CE. Furthermore, since activation and deactivation of semi-persistent CSI-RS and semi-persistent CSI-IM is done with the same MAC CE message, using that same MAC CE message to also indicate if the SP CSI-IM is to be rate matched around seems appropriate.

According to another proposal: whether semi-persistent CSI-IM REs are rate matched around or not is conveyed by the same MAC CE message as the one that activates/deactivates semi-persistent CSI-RS and semi-persistent CSI-IM. The following options can be considered:
   a) A CSI-IM-Resource in RRC is optionally associated with a ZP-CSI-RS-Resource;
   b) A CSI-IM-Resource in RRC has a true/false state that indicates if it's rate matched around;
   c) The MAC CE message can optionally activate a semi-persistent ZP CSI-RS resource set.

In conclusion, this RAN contribution presents views regarding the remaining details on ZP CSI-RS for rate matching and have made the following two observations:
   1. Observation 1 Separate CSI-IM and ZP CSI-RS configuration is useful for CoMP, but in most cases a CSI-IM resource would always have an overlapping ZP CSI-RS resource.
   2. Observation 2 According to current status of the spec, aperiodic ZP CSI-RS would need to be indicated with ZP CSI-RS field in DL DCI to rate match around aperiodic CSI-IM. This implies that only a single UE can receive beamformed NZP CSI-RS in a slot, since the ZP CSI-RS field cannot be used to indicate rate matching around other UEs NZP CSI-RS.

The RAN1 contribution made the following proposals:
Proposal 1 Introduce a ZP-CSI-RS-ResourceSet information element containing multiple ZP CSI-RS resource Ids. For periodic rate-matching of PDSCH, a zp-CSI-RS-ResourceSetId is configured in PDSCH-Config Proposal 2 NR supports a fixed length of 2 bits for the DCI field used to trigger aperiodic ZP CSI-RS for rate matching, if the presence of the ZP CSI-RS trigger field is configured Proposal 3 Each codepoint of the ZP CSI-RS trigger field is associated in RRC with a ZP CSI-RS resource set containing a number of aperiodic ZP CSI-RS resources Proposal 4 Whether aperiodic CSI-IM REs are rate matched around or not is conveyed by the CSI request field. The following options can be considered:
   A CSI-IM-Resource in RRC is optionally associated with a ZP-CSI-RS-Resource
   A CSI-IM-Resource in RRC has a true/false state that indicates if it's rate matched around
   The CSI request field can optionally trigger a ZP CSI-RS resource set Proposal 5 For the purpose of indicating rate matching around semi-persistent NZP CSI-RS of other UEs or cells, NR supports semi-persistent ZP CSI-RS Proposal 6 Semi-persistent ZP CSI-RS is activated/deactivate via MAC CE Proposal 7 Whether semi-persistent CSI-IM REs are rate matched around or not is conveyed by the same MAC CE message as the one that activates/deactivates semi-persistent CSI-RS and semi-persistent CSI-IM. The following options can be considered:

A CSI-IM-Resource in RRC is optionally associated with a ZP-CSI-RS-Resource

A CSI-IM-Resource in RRC has a true/false state that indicates if it's rate matched around The MAC CE message can optionally activate a semi-persistent ZP CSI-RS resource set The following details various non-limiting examples, grouped in separate groups referred to as "Group A Examples," "Group B Examples," "Group C Examples," and Group D Examples."

Group A Examples

1. A method performed by a wireless device of receiving, from a network node, a physical downlink channel. The method comprises receiving, from the network node, a first Downlink Control Information, DCI, message scheduling the physical downlink channel on a first plurality of Resource Elements, REs, and receiving, from the network node, a second DCI message scheduling an aperiodic Channel State Information Interference Measurement, CSI-IM, resource on a second plurality of REs in the downlink for CSI measurement. The second DCI message comprises a CSI request field, and the first plurality of REs includes at least a subset of the second plurality of Res. The method further comprises receiving the physical downlink channel on either the first plurality of REs or a third plurality of REs responsive to the CSI request field, said third plurality of REs comprising the first plurality of REs excluding the subset of the second plurality of REs.

2. The method of example 1, wherein the first and second DCI messages comprise the same DCI message.

3. The method of example 1, wherein the first and second DCI messages comprise different DCI messages.

4. The method of any one of examples 1-3, wherein receiving the physical downlink channel on either the first or third plurality of REs comprises receiving the physical downlink channel on the third plurality of REs when the CSI request field indicates a triggering of an aperiodic zero power CSI reference signal, A-ZP CSI-RS, resource.

5. The method of any one of examples 1-4 further comprising obtaining a plurality of CSI measurement configurations from the network node, wherein the CSI request field indicates one of the plurality of CSI measurement configurations as a current CSI measurement configuration.

6. The method of example 5 further comprising determining whether the current CSI measurement configuration for the wireless device comprises a rate matching indication indicating a rate matching of the physical downlink channel around the second plurality of REs.

7. The method of example 6 wherein the rate matching indication comprises a Boolean flag in an Information Element, IE, of the current CSI measurement configuration, wherein receiving the physical downlink channel on either the first or third plurality of REs comprises receiving the physical downlink channel on either the first plurality of REs or the third plurality of REs responsive to the Boolean flag.

8. The method of any one of examples 1-4 further comprising determining whether a CSI Interference Measurement, CSI-IM, resource configuration for the wireless device comprises a rate matching indication indicating a rate matching of the physical downlink channel around the second plurality of REs.

9. The method of example 8, wherein the rate matching indication comprises a Boolean flag in an Information Element, IE, of the CSI-IM resource configuration, wherein receiving the physical downlink channel on either the first or third plurality of REs comprises receiving the physical downlink channel on either the first plurality of REs or the third plurality of REs responsive to the Boolean flag.

10. The method of example 8 wherein the rate matching indication comprises a Zero Power CSI Reference Signal, ZP CSI-RS, resource identifier, wherein receiving the physical downlink channel on either the first or third plurality of REs comprises receiving the physical downlink channel on either the first plurality of REs or the third plurality of REs responsive to the ZP CSI-RS resource identifier.

11. The method of example 10 wherein the ZP CSI-RS resource identifier is comprised in an optional Information Element, IE, of the CSI-IM resource configuration.

12. The method of any one of examples 1-11 wherein the physical downlink channel comprises a Physical Downlink Shared Channel, PDSCH.

13. The method of any one of examples 1-12 wherein the first DCI message further comprises a trigger field indicating rate matching for a subset of the first plurality of REs associated with another wireless device in communication with the network node, wherein receiving the physical downlink channel comprises receiving the physical downlink channel on the first plurality of REs, the third plurality of REs, or a fourth plurality of REs responsive to the CSI request field and the trigger field, said fourth plurality of REs comprising the first plurality of REs excluding the subset of the first plurality of REs, wherein the subset of the first plurality of REs differs from the subset of the second plurality of REs.

AA. The method of any of the previous embodiments, further comprising providing user data; and forwarding the user data to a host computer via the transmission to the base station.

Group B Examples

14. A method performed by a base station of transmitting a physical downlink channel to a wireless device. The method comprising configuring a first Downlink Control Information, DCI, message scheduling the physical downlink channel on a first plurality of Resource Elements, REs; configuring a second DCI message scheduling an aperiodic Channel State Information Interference Measurement, CSI-IM, resource on a second plurality of REs in the downlink for CSI measurement; and transmitting, to the wireless device, the first and second DCI messages. The second DCI message comprises a CSI request field, and the first plurality of REs includes at least a subset of the second plurality of Res. The method further comprises transmitting the physical downlink channel to the wireless device on either the first plurality of REs or a third plurality of REs in accordance with the CSI request field, said third plurality of REs comprising the first plurality of REs excluding the subset of the second plurality of REs.

15. The method of example 14, wherein the first and second DCI messages comprise the same DCI message.

16. The method of example 14, wherein the first and second DCI messages comprise different DCI messages.

17. The method of any one of examples 14-16, wherein transmitting the physical downlink channel on either the first or third plurality of REs comprises transmitting the physical downlink channel on the third plurality of REs when the CSI request field indicates an Aperiodic Zero Power CSI Reference Signal, A-ZP CSI-RS, resource in the CSI request field.

18. The method of any one of examples 14-17 further comprising sending a plurality of CSI measurement configurations to the wireless device, wherein the CSI request field indicates one of the plurality of CSI measurement configurations as a current CSI measurement configuration.

19. The method of example 5 further comprising including a rate matching indication in the current CSI measurement configuration for the wireless device, said rate matching indication indicating a rate matching of the physical downlink channel around the second plurality of REs.

20. The method of example 19 wherein the rate matching indication comprises a Boolean flag in an Information Element, IE, of the current CSI measurement configuration, wherein transmitting the physical downlink channel on either the first or third plurality of REs comprises transmitting the physical downlink channel on either the first plurality of REs or the third plurality of REs in accordance with the Boolean flag.

21. The method of any one of examples 14-17 further comprising including a rate matching indication in a CSI Interference Measurement, CSI-IM, resource configuration for the wireless device, said rate matching indication indicating a rate matching of the physical downlink channel around the second plurality of REs.

22. The method of example 21, wherein the rate matching indication comprises a Boolean flag in an Information Element, IE, of the CSI-IM resource configuration, wherein transmitting the physical downlink channel on either the first or third plurality of REs comprises transmitting the physical downlink channel on either the first plurality of REs or the third plurality of REs in accordance with the Boolean flag.

23. The method of example 21 wherein the rate matching indication comprises a Zero Power CSI Reference Signal, ZP CSI-RS, resource identifier, wherein transmitting the physical downlink channel on either the first or third plurality of REs comprises transmitting the physical downlink channel on either the first plurality of REs or the third plurality of REs in accordance with the ZP CSI-RS resource identifier.

24. The method of example 23 wherein the ZP CSI-RS resource identifier is comprised in an optional Information Element, IE, of a CSI-IM configuration.

25. The method of any one of examples 14-24 wherein the physical downlink channel comprises a Physical Downlink Shared Channel, PDSCH.

26. The method of any one of examples 14-25 wherein the first DCI message further comprises a trigger field indicating rate matching for a subset of the first plurality of REs associated with another wireless device in communication with the base station, wherein transmitting the physical downlink channel comprises transmitting the physical downlink channel on the first plurality of REs, the third plurality of REs, or a fourth plurality of REs in accordance with the CSI request field and the trigger field, said fourth plurality of REs comprising the first plurality of REs excluding the subset of the first plurality of REs, wherein the subset of the first plurality of REs differs from the subset of the second plurality of REs.

BB. The method of any of the previous embodiments, further comprising obtaining user data; and forwarding the user data to a host computer or a wireless device.

Group C Examples

C1. A wireless device configured to perform any of the steps of any of the Group A examples.

C2. A wireless device comprising processing circuitry configured to perform any of the steps of any of the Group A examples; and power supply circuitry configured to supply power to the wireless device.

C3. A wireless device comprising processing circuitry and memory, the memory containing instructions executable by the processing circuitry whereby the wireless device is configured to perform any of the steps of any of the Group A examples.

C4. A user equipment (UE) comprising an antenna configured to send and receive wireless signals; radio front-end circuitry connected to the antenna and to processing circuitry, and configured to condition signals communicated between the antenna and the processing circuitry. The processing circuitry is configured to perform any of the steps of any of the Group A examples. The UE further comprising an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

C5. A computer program comprising instructions which, when executed by at least one processor of a wireless device, causes the wireless device to carry out the steps of any of the Group A examples.

C6. A carrier containing the computer program of example C5, wherein the carrier is one of an electronic signal, optical signal, radio signal, or computer readable storage medium.

C7. A base station configured to perform any of the steps of any of the Group B examples.

C8. A base station comprising processing circuitry configured to perform any of the steps of any of the Group B examples; power supply circuitry configured to supply power to the base station.

C9. A base station comprising processing circuitry and memory, the memory containing instructions executable by the processing circuitry whereby the base station is configured to perform any of the steps of any of the Group B examples.

C10. A computer program comprising instructions which, when executed by at least one processor of a base station, causes the base station to carry out the steps of any of the Group B examples.

C11. A carrier containing the computer program of example C10, wherein the carrier is one of an electronic signal, optical signal, radio signal, or computer readable storage medium.

Group D Examples

D1. A communication system including a host computer comprising processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B examples.

D2. The communication system of the pervious example further including the base station.

D3. The communication system of the previous 2 examples, further including the UE, wherein the UE is configured to communicate with the base station.

D4. The communication system of the previous 3 examples, wherein the processing circuitry of the host computer is configured to execute a host application, thereby providing the user data; and the UE comprises processing circuitry configured to execute a client application associated with the host application.

D5. A method implemented in a communication system including a host computer, a base station and a user equipment (UE), the method comprising at the host computer, providing user data; and at the host computer, initiating a transmission carrying the user data to the UE via a cellular network comprising the base station, wherein the base station performs any of the steps of any of the Group B examples.

D6. The method of the previous example, further comprising, at the base station, transmitting the user data.

D7. The method of the previous 2 examples, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform any of the previous 3 examples.

D9. A communication system including a host computer comprising processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A examples.

D10. The communication system of the previous example, wherein the cellular network further includes a base station configured to communicate with the UE.

D11. The communication system of the previous 2 examples, wherein the processing circuitry of the host computer is configured to execute a host application, thereby providing the user data; and the UE's processing circuitry is configured to execute a client application associated with the host application.

D12. A method implemented in a communication system including a host computer, a base station and a user equipment (UE), the method comprising at the host computer, providing user data; and at the host computer, initiating a transmission carrying the user data to the UE via a cellular network comprising the base station, wherein the UE performs any of the steps of any of the Group A examples.

D13. The method of the previous example, further comprising at the UE, receiving the user data from the base station.

D14. A communication system including a host computer comprising communication interface configured to receive user data originating from a transmission from a user equipment (UE) to a base station, wherein the UE comprises a radio interface and processing circuitry, the UE's processing circuitry configured to perform any of the steps of any of the Group A examples.

D15. The communication system of the previous example, further including the UE.

D16. The communication system of the previous 2 examples, further including the base station, wherein the base station comprises a radio interface configured to communicate with the UE and a communication interface configured to forward to the host computer the user data carried by a transmission from the UE to the base station.

D17. The communication system of the previous 3 examples, wherein the processing circuitry of the host computer is configured to execute a host application; and the UE's processing circuitry is configured to execute a client application associated with the host application, thereby providing the user data.

D18. The communication system of the previous 4 examples, wherein the processing circuitry of the host computer is configured to execute a host application, thereby providing request data; and the UE's processing circuitry is configured to execute a client application associated with the host application, thereby providing the user data in response to the request data.

D19. A method implemented in a communication system including a host computer, a base station and a user equipment (UE), the method comprising at the host computer, receiving user data transmitted to the base station from the UE, wherein the UE performs any of the steps of any of the Group A examples.

D20. The method of the previous example, further comprising, at the UE, providing the user data to the base station.

D21. The method of the previous 2 examples, further comprising at the UE, executing a client application, thereby providing the user data to be transmitted; and at the host computer, executing a host application associated with the client application.

D22. The method of the previous 3 examples, further comprising at the UE, executing a client application; and at the UE, receiving input data to the client application, the input data being provided at the host computer by executing a host application associated with the client application, wherein the user data to be transmitted is provided by the client application in response to the input data.

D23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B examples.

D24. The communication system of the previous example further including the base station.

D25. The communication system of the previous 2 examples, further including the UE, wherein the UE is configured to communicate with the base station.

D26. The communication system of the previous 3 examples, wherein the processing circuitry of the host computer is configured to execute a host application; the UE is configured to execute a client application associated with the host application, thereby providing the user data to be received by the host computer.

D27. A method implemented in a communication system including a host computer, a base station and a user equipment (UE), the method comprising at the host computer, receiving, from the base station, user data originating from a transmission which the base station has received from the UE, wherein the UE performs any of the steps of any of the Group A examples.

D28. The method of the previous example, further comprising at the base station, receiving the user data from the UE.

D29. The method of the previous 2 examples, further comprising at the base station, initiating a transmission of the received user data to the host computer. The solution presented herein may, of course, be carried out in other ways than those specifically set forth herein without departing from essential characteristics of the solution presented herein. The examples presented herein are to be considered in all respects as illustrative and not restrictive, and all changes coming within the meaning and equivalency range of the appended claims are intended to be embraced therein.

What is claimed is:

1. A method performed by a wireless device of receiving, from a network node, a physical downlink channel, the method comprising:
receiving, from the network node, a first Downlink Control Information (DCI) scheduling the physical downlink channel on a first plurality of Resource Elements (REs);
receiving, from the network node, a second DCI scheduling an aperiodic interference measurement resource on a second plurality of REs in the downlink for interference measurement;
wherein the second DCI comprises a request field, and wherein the first plurality of REs includes at least a subset of the second plurality of REs, and a subset of the second plurality of REs overlaps with some portion of the first plurality of REs; and
responsive to the request field, receiving, from the network node, the physical downlink channel on a third plurality of REs when the request field indicates a triggering of an Aperiodic Zero Power Channel State Information Reference Signal (A-ZP CSI-RS) resource, said third plurality of REs comprising the first plurality of REs excluding the subset of the second plurality of REs.

2. The method of claim 1 further comprising:
obtaining a plurality of interference measurement resource configurations from the network node;
wherein the request field indicates at least one of the plurality of interference measurement resource configurations as one or more current interference measurement resource configurations.

3. The method of claim 2 further comprising determining, for each of the one or more current interference measurement resource configurations, whether the current interference measurement resource configuration for the wireless device comprises a rate matching indication indicating a rate matching of the physical downlink channel around the second plurality of REs.

4. The method of claim 3 wherein:
the rate matching indication for each of the one or more current interference measurement resource configurations comprises a Boolean flag in an Information Element (IE) of the current interference measurement resource configuration; and
said receiving the physical downlink channel on either the first or third plurality of REs comprises receiving the physical downlink channel on either the first plurality of REs or the third plurality of REs responsive to the Boolean flag.

5. The method of claim 1 further comprising determining whether an interference measurement resource configuration for the wireless device comprises a rate matching indication indicating a rate matching of the physical downlink channel around the second plurality of REs.

6. The method of claim 5, wherein the rate matching indication comprises:
a Boolean flag in an Information Element (IE) of the interference measurement resource configuration, wherein said receiving the physical downlink channel on either the first or third plurality of REs comprises receiving the physical downlink channel on either the first plurality of REs or the third plurality of REs responsive to the Boolean flag; or
a Zero Power Channel State Information Reference Signal (ZP CSI-RS) resource identifier, wherein said receiving the physical downlink channel on either the first or third plurality of REs comprises receiving the physical downlink channel on either the first plurality of REs or the third plurality of REs responsive to the ZP CSI-RS resource identifier.

7. The method of claim 6 wherein the ZP CSI-RS resource identifier is comprised in an optional Information Element (IE) of the interference measurement resource configuration.

8. The method of claim 1 wherein:
the first DCI further comprises a trigger field indicating rate matching for a subset of the first plurality of REs associated with another wireless device in communication with the network node;
said receiving the physical downlink channel comprises receiving the physical downlink channel on the first plurality of REs, the third plurality of REs, or a fourth plurality of REs responsive to the request field and the trigger field, said fourth plurality of REs comprising the first plurality of REs excluding the subset of the first plurality of REs; and
the subset of the first plurality of REs differs from the subset of the second plurality of REs.

9. The method of claim 1 wherein the aperiodic interference measurement resource comprises an aperiodic Channel State Information Interference Measurement (CSI-IM) resource.

10. A wireless device configured to:
receive a first Downlink Control Information (DCI) scheduling a physical downlink channel on a first plurality of Resource Elements (REs);
receive a second DCI scheduling an aperiodic interference measurement resource on a second plurality of REs in the downlink for interference measurement;
wherein the second DCI comprises a request field, and wherein the first plurality of REs includes at least a subset of the second plurality of REs, and a subset of the second plurality of REs overlaps with some portion of the first plurality of REs; and
responsive to the request field, receive the physical downlink channel on a third plurality of REs when the request field indicates a triggering of an Aperiodic Zero Power Channel State Information Reference Signal (A-ZP CSI-RS) resource, said third plurality of REs comprising the first plurality of REs excluding the subset of the second plurality of REs.

11. The wireless device of claim 10 further configured to:
obtain a plurality of interference measurement resource configurations from the network node;
wherein the request field indicates at least one of the plurality of interference measurement resource configurations as one or more current interference measurement resource configurations.

12. A method performed by a network node of transmitting a physical downlink channel to a wireless device, the method comprising:
configuring a first Downlink Control Information (DCI) scheduling the physical downlink channel on a first plurality of Resource Elements (REs);
configuring a second DCI scheduling an aperiodic interference measurement resource on a second plurality of REs in the downlink for interference measurement; and
transmitting, to the wireless device, the first and second DCIs;

wherein the second DCI comprises a request field;
wherein the first plurality of REs includes at least a subset of the second plurality of REs, and a subset of the second plurality of REs overlaps with some portion of the first plurality of REs; and
responsive to the request field, transmitting the physical downlink channel on a third plurality of REs when the request field indicates an Aperiodic Zero Power Channel State Information Reference Signal (A-ZP CSI-RS) resource in the request field, said third plurality of REs comprising the first plurality of REs excluding the subset of the second plurality of REs.

13. The method of claim 12 further comprising:
sending a plurality of interference measurement resource configurations to the wireless device;
wherein the request field indicates at least one of the plurality of interference measurement resource configurations as one or more current interference measurement resource configuration.

14. The method of claim 13 further comprising:
including, for each of the one or more current interference measurement resource configurations, a rate matching indication in the current interference measurement resource configuration for the wireless device;
wherein said rate matching indication indicating a rate matching of the physical downlink channel around the second plurality of REs.

15. The method of claim 14 wherein:
the rate matching indication for each of the one or more current interference measurement resource configurations comprises a Boolean flag in an Information Element (IE) of the current interference measurement resource configuration; and
said transmitting the physical downlink channel on either the first or third plurality of REs comprises transmitting the physical downlink channel on either the first plurality of REs or the third plurality of REs in accordance with the Boolean flag.

16. The method of claim 12 further comprising:
including a rate matching indication in an interference measurement resource configuration for the wireless device;
wherein said rate matching indication indicating a rate matching of the physical downlink channel around the second plurality of REs.

17. The method of claim 16, wherein the rate matching indication comprises:
a Boolean flag in an Information Element (IE) of the interference measurement resource configuration, wherein said transmitting the physical downlink channel on either the first or third plurality of REs comprises transmitting the physical downlink channel on either the first plurality of REs or the third plurality of REs in accordance with the Boolean flag; or
a Zero Power Channel State Information Reference Signal (ZP CSI-RS) resource identifier, wherein said transmitting the physical downlink channel on either the first or third plurality of REs comprises transmitting the physical downlink channel on either the first plurality of REs or the third plurality of REs in accordance with the ZP CSI-RS resource identifier.

18. The method of claim 17 wherein the ZP CSI-RS resource identifier is comprised in an optional Information Element (IE) of a CSI-IM configuration.

19. The method of claim 12 wherein:
the first DCI further comprises a trigger field indicating rate matching for a subset of the first plurality of REs associated with another wireless device in communication with the network node;
said transmitting the physical downlink channel comprises transmitting the physical downlink channel on the first plurality of REs, the third plurality of REs, or a fourth plurality of REs in accordance with the request field and the trigger field, said fourth plurality of REs comprising the first plurality of REs excluding the subset of the first plurality of REs; and
the subset of the first plurality of REs differs from the subset of the second plurality of REs.

20. A network node configured to:
configure a first Downlink Control Information (DCI) scheduling a physical downlink channel on a first plurality of Resource Elements (REs);
configure a second DCI scheduling an aperiodic interference measurement resource on a second plurality of REs in the downlink for interference measurement; and
transmit, to a wireless device, the first and second DCIs;
wherein the second DCI comprises a request field;
wherein the first plurality of REs includes at least a subset of the second plurality of REs, and a subset of the second plurality of REs overlaps with some portion of the first plurality of REs; and
responsive to the request field, transmit the physical downlink channel on a third plurality of REs when the request field indicates an Aperiodic Zero Power Channel State Information Reference Signal (A-ZP CSI-RS) resource in the request field, said third plurality of REs comprising the first plurality of REs excluding the subset of the second plurality of REs.

21. The network node of claim 20, further configured to:
include, for each of the one or more current interference measurement resource configurations, a rate matching indication in the current interference measurement resource configuration for the wireless device;
wherein said rate matching indication indicating a rate matching of the physical downlink channel around the second plurality of REs.

* * * * *